(12) United States Patent
Liao et al.

(10) Patent No.: US 12,549,232 B2
(45) Date of Patent: Feb. 10, 2026

(54) COMMUNICATION METHOD AND APPARATUS

(71) Applicant: HUAWEI TECHNOLOGIES CO., LTD., Shenzhen (CN)

(72) Inventors: Shuri Liao, Shanghai (CN); Shengyue Dou, Shanghai (CN); Yuejun Wei, Shanghai (CN); Kedi Wu, Shanghai (CN); Weiqiang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 546 days.

(21) Appl. No.: 18/079,273

(22) Filed: Dec. 12, 2022

(65) Prior Publication Data

US 2023/0108591 A1    Apr. 6, 2023

Related U.S. Application Data

(63) Continuation of application No. PCT/CN2021/098163, filed on Jun. 3, 2021.

(30) Foreign Application Priority Data

Jun. 11, 2020   (CN) .......................... 202010531821.3

(51) Int. Cl.
*H04B 7/06* (2006.01)
*H04B 7/0452* (2017.01)
*H04L 1/00* (2006.01)

(52) U.S. Cl.
CPC ......... *H04B 7/0626* (2013.01); *H04B 7/0452* (2013.01); *H04B 7/0632* (2013.01); *H04L 1/0003* (2013.01)

(58) Field of Classification Search
CPC .. H04B 7/0626; H04B 7/0452; H04B 7/0632; H04L 1/0003; H04L 1/0026; H04L 1/0009; H04L 1/0021
See application file for complete search history.

(56) References Cited

U.S. PATENT DOCUMENTS

2014/0105048 A1    4/2014  Tellado et al.
2018/0324815 A1*  11/2018  Nammi ................ H04B 7/0639
(Continued)

FOREIGN PATENT DOCUMENTS

CA    3035020 A1    5/2019
CN    106664284 A   5/2017
(Continued)

OTHER PUBLICATIONS

Guochao Song et al. "KPI/KQI-Driven Coordinated Multipoint in 5G: Measurements, Field Trials, and Technical Solutions," in IEEE Wireless Communications, vol. 25, No. 5, pp. 23-29, Oct. 2018, doi: 10.1109/MWC.2018.1800041 (Year: 2018).*
(Continued)

*Primary Examiner* — Charles C Jiang
*Assistant Examiner* — Margaret Marie Anderson
(74) *Attorney, Agent, or Firm* — HAUPTMAN HAM, LLP

(57) ABSTRACT

A communication method includes obtaining network transmission quality information and channel state information (CSI), where the network transmission quality information indicates communication quality of extended reality (XR) data during network transmission; and managing a data communication manner based on the network transmission quality information and the CSI. According to the method, when managing a manner of data communication, a network device considers network transmission quality information that can reflect XR experience, thereby improving XR experience of a terminal device in a communication system, and further effectively increasing a quantity of users satisfied with the XR experience in the communication system.

20 Claims, 10 Drawing Sheets

A network device obtains network transmission quality information and CSI, where the network transmission quality information indicates communication quality of extended reality XR data during network transmission ~501

The network device manages a data communication manner based on the network transmission quality information and the CSI ~502

(56) References Cited

U.S. PATENT DOCUMENTS

2019/0384976 A1    12/2019  Lee
2020/0052751 A1     2/2020  Nammi

FOREIGN PATENT DOCUMENTS

| CN | 107733491 A | 2/2018 |
|---|---|---|
| CN | 108965949 A | 12/2018 |
| CN | 109792430 A | 5/2019 |
| CN | 110741567 A | 1/2020 |
| CN | 111034097 A | 4/2020 |
| WO | 2018082672 A1 | 5/2018 |

OTHER PUBLICATIONS

Guochao Song et al: "KPI/KQI-Driven Coordinated Multi-Point in 5G: Measurements, Field Trials, and Technical Solutions", arxiv.org, Cornell University Library, 201 Olin Library Cornell University Ithaca, NY 14853, Apr. 16, 2019 (Apr. 16, 2019), XP081169861, total 15 pages.
Extended European Search Report issued in corresponding European Application No. 21822865.8, dated Sep. 18, 2023, pp. 1-7.
3GPP TR 26.928 V16.0.0 :"3rd Generation Partnership Project; Technical Specification Group Services and System Aspects; Extended Reality (XR) in 5G (Release 16)",Mar. 2020, total 131 pages.
International Search Report issued in corresponding International Application No. PCT/CN2021/098163, dated Sep. 1, 2021, pp. 1-9.
Chinese Office Action issued in corresponding Chinese Application No. 202010531821.3, dated Dec. 2, 2022, pp. 1-10.

\* cited by examiner

COMMUNICATION METHOD AND APPARATUS

CROSS-REFERENCE TO RELATED APPLICATIONS

This application is a continuation of International Application No. PCT/CN2021/098163, filed on Jun. 3, 2021, which claims priority to Chinese Patent Application No. 202010531821.3, filed on Jun. 11, 2020. The disclosures of the aforementioned applications are hereby incorporated by reference in their entireties.

TECHNICAL FIELD

This application relates to the field of communication technologies, and in particular, to a communication method and an apparatus that are related to an extended reality (extended reality, XR) service.

BACKGROUND

The XR technology has been developing in recent years, and driving vigorous development of entertainment, gaming, healthcare, and other related industries. XR includes virtual reality (virtual reality, VR), augmented reality (augmented reality, AR), and mixed reality (mixed reality, MR).

The focus of XR technology research includes an experience evaluation model, which focuses on experience of XR services. However, in a current technology, a requirement of the XR service cannot be met because data scheduling transmission aims to maximize a throughput.

SUMMARY

This application provides a data communication method, to maximize XR experience, improve XR experience of a user, and ensure a quantity of XR users satisfied with the XR experience in a system.

According to a first aspect, a communication method is provided. The method includes: obtaining network transmission quality information and channel state information CSI, where the network transmission quality information indicates communication quality of XR data during network transmission; and managing a data communication manner based on the network transmission quality information and the CSI.

When managing a manner of data communication with a terminal device, a network device considers network transmission quality information that can reflect XR experience, thereby improving XR experience of a terminal device in a communication system, and further effectively increasing a quantity of users satisfied with the XR experience in the communication system.

In a possible design, the data communication manner includes: a data communication manner that is based on multiple-input multiple-output MIMO.

In a possible design, that the managing a data communication manner based on the network transmission quality information and the CSI is determining, based on the network transmission quality information and the CSI, pairing that is based on MU-MIMO and determining a scheduling sequence that is based on SU-MIMO specifically includes: determining, based on the CSI, a first terminal device group that meets an MU-MIMO pairing condition, and filtering terminal devices in the first terminal device group based on the network transmission quality information, to obtain a second terminal device group participating in MU-MIMO pairing; obtaining, based on the network transmission quality information, a scheduling sequence that is based on SU-MIMO for terminal devices in the second terminal device group; and filtering transport layers of the terminal devices in the second terminal device group based on the scheduling sequence that is based on SU-MIMO and the network transmission quality information, to obtain transport layers that are of the terminal devices in the second terminal device group and that participate in MU-MIMO pairing.

With reference to the network transmission quality information that can reflect the XR experience, the network device determines policies such as pairing and scheduling for performing MIMO data communication with the terminal device, aiming to maximize the XR experience, thereby effectively improving the XR experience, and ensuring the quantity of XR users satisfied with the XR experience.

In a possible design, source data corresponding to the data communication is divided into source data of a basic layer and source data of an enhancement layer, and the network transmission quality information includes first network transmission quality information corresponding to the basic layer, second network transmission quality information corresponding to the enhancement layer, and total network transmission quality information.

In a possible design, that the managing a data communication manner based on the network transmission quality information and the CSI is managing, based on the network transmission quality and the CSI, the data communication manner that is based on MIMO specifically includes: determining, based on the CSI, a first terminal device group that meets an MU-MIMO pairing condition, and filtering terminal devices in the first terminal device group based on at least one of the total network transmission quality information, the first network transmission quality information, and the second network transmission quality information, to obtain a second terminal device group participating in MU-MIMO pairing; obtaining, based on at least one of the total network transmission quality information, the first network transmission quality information, and the second network transmission quality information, a scheduling sequence that is based on SU-MIMO for terminal devices in the second terminal device group; and filtering first transport layers and/or second transport layers of the terminal devices in the second terminal device group based on the scheduling sequence that is based on SU-MIMO and at least one of the total network transmission quality information, the first network transmission quality information, and the second network transmission quality information, to obtain third transport layers and/or fourth transport layers that are of the terminal devices in the second terminal device group and that participate in MU-MIMO pairing, where the first transport layer and the third transport layer correspond to the basic layer, and the second transport layer and the fourth transport layer correspond to the enhancement layer.

In a scenario in which the source data is layered, by comprehensively considering the total network transmission quality information and/or network transmission quality information of each layer that can reflect the XR experience, the network device determines policies such as pairing and scheduling for performing MIMO data communication with the terminal device, aiming to maximize the XR experience, thereby effectively improving the XR experience, and ensuring the quantity of XR users satisfied with the XR experience.

In a possible design, the data communication manner includes: a modulation and coding scheme MCS and/or resource scheduling manner of data communication.

In a possible design, that the managing a data communication manner based on the network transmission quality information and the CSI is determining, based on the network transmission quality information and the CSI, the MCS and/or resource scheduling manner of data communication specifically includes: determining an initial MCS index of the data communication based on the network transmission quality information and the CSI, adjusting the MCS index of the data communication, and/or determining a resource scheduling priority of the data communication.

With reference to the network transmission quality information that can reflect the XR experience, the network device determines the MCS and/or resource scheduling manner of data communication, aiming to maximize the XR experience, thereby effectively improving the XR experience, and ensuring the quantity of XR users satisfied with the XR experience.

In a possible design, that the managing a data communication manner based on the network transmission quality information and the CSI is determining, based on the network transmission quality and the CSI, the MCS and/or resource scheduling manner of data communication specifically includes: determining an initial MCS index of data communication at the basic layer based on the first network transmission quality information and the first CSI, adjusting the MCS index of data communication at the basic layer, and/or determining a resource scheduling priority of data communication at the basic layer; and determining an initial MCS index of data communication at the enhancement layer based on the second network transmission quality information and the second CSI, adjusting the MCS index of data communication at the enhancement layer, and/or determining a resource scheduling priority of data communication at the enhancement layer.

In a scenario in which the source data is layered, by comprehensively considering the total network transmission quality information and/or network transmission quality information of each layer that can reflect the XR experience, the network device determines an MCS and/or resource scheduling manner of layered data communication, aiming to maximize the XR experience, thereby effectively improving the XR experience, and ensuring the quantity of XR users satisfied with the XR experience.

In a possible design, the network transmission quality information includes at least one of an XR quality index XQI, an XQI threshold, and an XQI gain.

According to a second aspect, another communication method is provided. The method includes: sending channel state information CSI to a network device; and accepting management performed by the network device on a data communication manner, where the data communication manner is determined based on the CSI and network transmission quality information, and the network transmission quality information indicates communication quality of XR data during network transmission.

When managing a manner of data communication, a network device considers network transmission quality information that can reflect XR experience, thereby improving XR experience of a terminal device in a communication system, and further effectively increasing a quantity of users satisfied with the XR experience in the communication system.

In a possible design, the method further includes: sending the network transmission quality information to the network device.

In a possible design, the data communication manner includes: a data communication manner that is based on multiple-input multiple-output MIMO.

In a possible design, that the accepting management performed by the network device on a data communication manner is accepting management performed by the network device on the data communication manner that is based on MIMO specifically includes: accepting pairing information based on multiple-user multiple-input multiple-output MU-MIMO and scheduling sequence information based on single-user multiple-input multiple-output SU-MIMO.

In a possible design, the data communication manner includes: a modulation and coding scheme MCS and/or resource scheduling manner of data communication.

In a possible design, that the accepting management performed by the network device on a data communication manner is accepting management performed by the network device on the modulation and coding scheme MCS and/or resource scheduling manner of the data communication specifically includes: receiving an initial MCS index of the data communication, an adjusted MCS index of the data communication, and/or priority information of resource scheduling of the data communication.

In a possible design, source data corresponding to the data communication is divided into source data of a basic layer and source data of an enhancement layer, and the network transmission quality information includes first network transmission quality information corresponding to the basic layer, and second network transmission quality information corresponding to the enhancement layer; and the CSI includes first CSI corresponding to the basic layer and second CSI corresponding to the enhancement layer; and that the data communication manner is determined based on the CSI and network transmission quality information includes: the data communication manner is determined based on the first CSI, the second CSI, and at least one of the total network transmission quality information, the first network transmission quality information, and the second network transmission quality information.

In a possible design, the network transmission quality information includes at least one of an XR quality index XQI, an XQI threshold, and an XQI gain.

According to a third aspect, at least one embodiment of this application provides an apparatus. The apparatus may implement the method according to the first aspect or any possible design of the first aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a fourth aspect, at least one embodiment of this application provides an apparatus. The apparatus may implement the method according to the second aspect or any possible design of the second aspect. The apparatus includes a corresponding unit or component configured to perform the foregoing method. The unit included in the apparatus may be implemented by software and/or hardware. The apparatus may be, for example, a terminal device, or a chip, a chip system, or a processor that can support the terminal device in implementing the foregoing method.

According to a fifth aspect, at least one embodiment of this application provides an apparatus. The apparatus includes a processor. The processor is coupled to a memory. The memory is configured to store a program or instructions. When the program or the instructions are executed by the processor, the apparatus is enabled to implement the method according to the first aspect or any possible design of the first aspect.

According to a sixth aspect, at least one embodiment of this application provides an apparatus. The apparatus includes a processor. The processor is coupled to a memory. The memory is configured to store a program or instructions. When the program or the instructions are executed by the processor, the apparatus is enabled to implement the method according to the second aspect or any possible design of the second aspect.

According to a seventh aspect, at least one embodiment of this application provides a non-transitory computer-readable medium, storing a computer program or instructions. When the computer program or the instructions are executed, a computer is enabled to perform the method in the first aspect or any possible design of the first aspect.

According to an eighth aspect, at least one embodiment of this application provides a non-transitory computer-readable medium, storing a computer program or instructions. When the computer program or the instructions are executed, a computer is enabled to perform the method in the second aspect or any possible design of the second aspect.

According to a ninth aspect, at least one embodiment of this application provides a computer program product. The computer program product includes computer program code. When the computer program code is run on a computer, the computer is enabled to perform the method according to the first aspect or any possible design of the first aspect.

According to a tenth aspect, at least one embodiment of this application provides a computer program product. The computer program product includes computer program code. When the computer program code is run on a computer, the computer is enabled to perform the method according to the second aspect or any possible design of the second aspect.

According to an eleventh aspect, at least one embodiment of this application provides a chip. The chip includes a processor. The processor is coupled to a memory. The memory is configured to store a program or instructions. When the program or the instructions are executed by the processor, the chip is enabled to implement the method according to the first aspect or any possible design of the first aspect.

According to a twelfth aspect, at least one embodiment of this application provides a chip. The chip includes a processor. The processor is coupled to a memory. The memory is configured to store a program or instructions. When the program or the instructions are executed by the processor, the chip is enabled to implement the method according to the second aspect or any possible design of the second aspect.

DESCRIPTION OF EMBODIMENTS

In embodiments of this application, "at least one" means one or more, and "a plurality of" means two or more than two. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof indicates any combination of these items, including any combination of singular items (pieces) or plural items (pieces). For example, at least one (piece) of a, b, or c may represent a, b, c, a and b, a and c, b and c, or a, b, and c, where each of a, b, and c may be an element, or may be a set including one or more elements.

In embodiments of this application, "for example", "in some embodiments", "in at least one embodiment", "in another embodiment", "in an implementation", or the like is used to represent giving an example, an illustration, or descriptions. Any embodiment or design scheme described as an "example" in this application should not be explained as being more preferred or having more advantages than another embodiment or design scheme. Exactly, the term "example" is used to present a concept in a specific manner.

In embodiments of this application, communication and transmission may be interchangeably used sometimes. It should be noted that meanings expressed by the terms are consistent when differences are not emphasized. For example, transmitting may include sending and/or receiving, and may be a noun or a verb.

It should be noted that, in embodiments of this application, terms such as "first" and "second" are only used for a purpose of distinction in description, but should not be understood as an indication or implication of relative importance or an indication or implication of a sequence. In embodiments of this application, "equal to" may be used together with "greater than", and this is applicable to a technical solution used when "greater than" is used; or "equal to" may be used together with "less than", and this is applicable to a technical solution used when "less than" is used. It should be noted that, when "equal to" is used together with "greater than", "equal to" is not used together with "less than", or when "equal to" is used together with "less than", "equal to" is not used together with "greater than".

The following describes the technical solutions in embodiments of this application with reference to the accompanying drawings in embodiments of this application.

Figure 1:
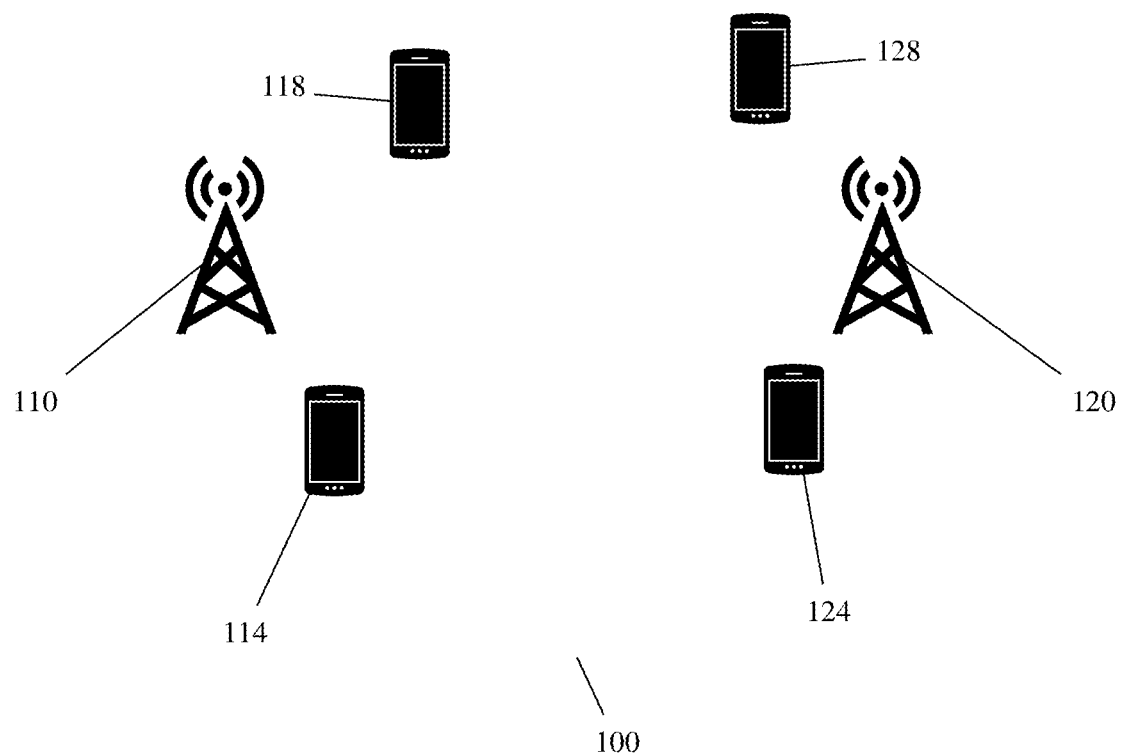
FIG. 1 is a schematic diagram of an architecture of a communication system according to at least one embodiment of this application.

FIG. 1 is a schematic diagram of a possible architecture of a communication system applied to at least one embodiment of this application. A communication system 100 includes one or more network devices (a network device 110 and a network device 120 shown in the figure), and one or more terminal devices that communicate with the one or more network devices. A terminal device 114 and a terminal device 118 shown in FIG. 1 communicate with the network device 110, and a terminal device 124 and a terminal device 128 shown in FIG. 1 communicate with the network device 120. It may be understood that the network device and the terminal device may also be referred to as communication devices.

The communication system 100 may be various communication systems, for example, a 4th generation (4th generation, 4G) communication system, a 4.5G communication system, a 5G communication system, a system converged by a plurality of communication systems, and a future evolved communication system (for example, a 6G communication system). For example, the communication system may be a long term evolution (long term evolution, LTE) system, a new radio (new radio, NR) system, a wireless fidelity (wireless fidelity, Wi-Fi) system, a wireless self-organizing system, a device-to-device direct communication system, a communication system related to the 3rd Generation Partnership Project (3rd generation partnership project, 3GPP), and another communication system of this type.

Figure 2:
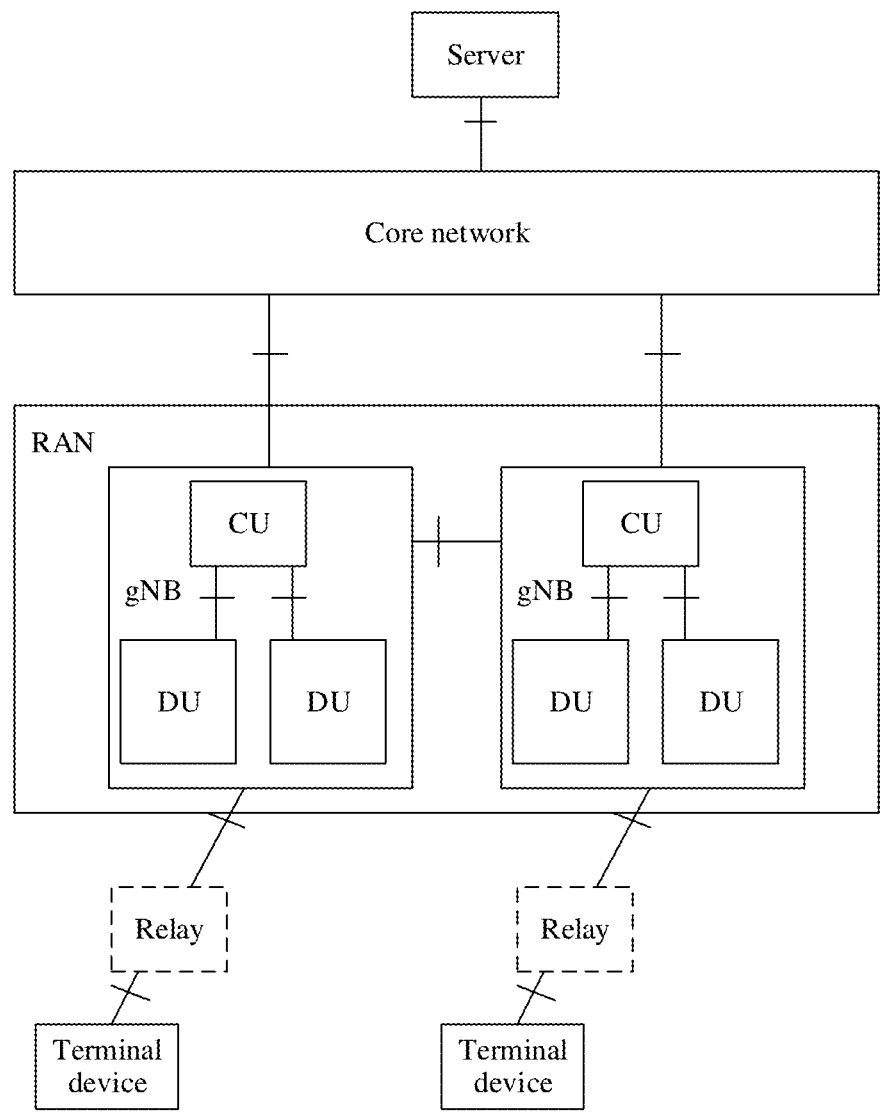
FIG. 2 is a schematic diagram of a structure of an NR system according to at least one embodiment of this application.

For example, FIG. 2 shows a schematic diagram of a structure of an NR system. A network device in a radio access network (radio access network, RAN) includes a network device (for example, a gNodeB or a gNB) with an architecture in which a central unit (central unit, CU) and a distributed unit (distributed unit, DU) are separated. The RAN may be connected to a core network (for example, may be an LTE core network or an NR core network), and the core network may be connected to a server (server). The server is a device that provides computing or application services. It may be understood that the network device is divided into the CU and the DU from the perspective of a logical function. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (packet data convergence protocol, PDCP) layer and a radio resource control (radio resource control, RRC) layer are distributed to the CU, but functions of a radio link control (radio link control, RLC) layer, a media access control (media access control, MAC) layer, and a physical (physical) layer are distributed to the DU. It may be understood that, division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. In a design, some functions of the RLC layer and functions of a protocol layer above the RLC layer are distributed to the CU, and remaining functions of the RLC layer and functions of a protocol layer below the RLC layer are distributed to the DU. In another design, functions of the CU or the DU may alternatively be obtained through division based on a service type or another system requirement. For example, division is performed based on a latency, a function whose processing time needs to satisfy a latency requirement is disposed on the DU, and a function whose processing time does not need to satisfy the latency requirement is disposed on the CU. The network architecture shown in FIG. 2 may be applied to the NR system, and may alternatively share one or more components or resources with an LTE system. In another design, the CU may alternatively have one or more functions of the core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of a base station.

The network device is connected to one or more terminal devices through an air interface, to perform data communication.

In an implementation, the network device and the terminal device may further communicate with each other by using a relay device (Relay). As shown by a dashed line in the figure, the relay device may be a small cell similar to a base station, for example, an integrated access and backhaul (integrated access and backhaul, IAB) base station, or a terminal device.

It may be understood that embodiments provided in this application are also applicable to an architecture in which the CU and the DU are not separated.

Figure 3:
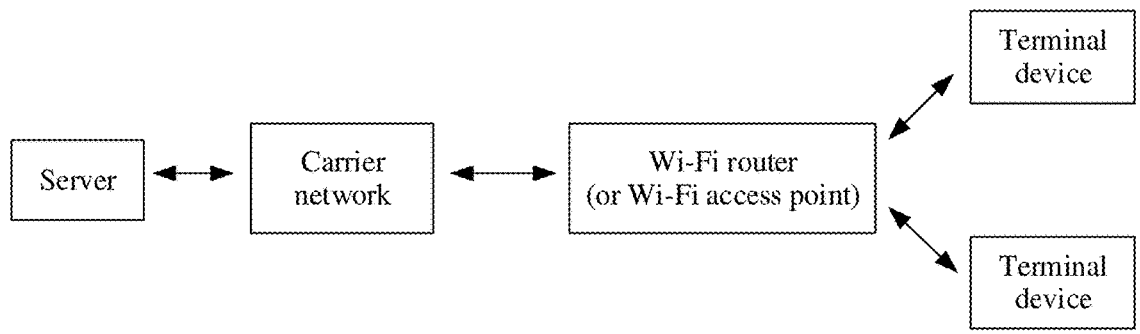
FIG. 3 is a schematic diagram of a structure of a wireless fidelity (wireless fidelity, Wi-Fi) system according to at least one embodiment of this application.

For another example, FIG. 3 is a schematic diagram of a structure of a Wi-Fi system. In FIG. 3, a server performs data communication with a terminal device by using an operator network through a Wi-Fi router (or a Wi-Fi access point). A function of the Wi-Fi access point is to enable the terminal device to enter a wired network.

Figure 4:
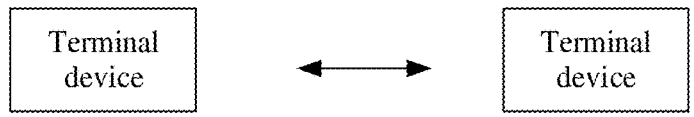
FIG. 4 is a schematic diagram of a structure of a device-to-device direct communication system according to at least one embodiment of this application.

For another example, FIG. 4 shows a schematic diagram of a structure of a device-to-device direct communication system. In FIG. 4, two terminal devices may directly communicate with each other through a sidelink (Sidelink), and the sidelink is used for communication between terminal devices.

The following explains and describes some communication nouns or terms used in this application.

1. Terminal Device

The terminal device may be referred to as a terminal for short, and is a device having a wireless transceiver function.

The terminal device may be deployed on land, including being deployed indoor or outdoor or being handheld or vehicle-mounted; may be deployed on water (for example, on a ship); or may be deployed in the air (for example, on a plane, a balloon, or a satellite). The terminal device may be a mobile phone (mobile phone), a tablet computer (pad), a computer having a wireless transceiver function, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), user equipment (user equipment, UE), or the like. Alternatively, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5th generation (5th generation, 5G) network, a terminal device in a future evolved public land mobile network (public land mobile network, PLMN), or the like. Sometimes, the terminal device may also be referred to as a terminal, user equipment (user equipment, UE), an access terminal device, a vehicle-mounted terminal device, an industrial control terminal device, a UE unit, a UE station, a mobile station, a mobile station, a remote station, a remote terminal device, a mobile device, a UE terminal device, a terminal device, a wireless communication device, a UE agent, a UE apparatus, or the like.

Particularly, in embodiments of this application, the terminal device may alternatively be an XR terminal device, including a VR terminal device, an AR terminal device, and an MR terminal device. The XR terminal may be, for example, a head mounted device (for example, a helmet or glasses), may be an all-in-one machine, or may be a television, a display, a car, a vehicle-mounted device, a tablet, or a smart screen. The XR terminal can present XR data to a user, and the user can experience diversified XR services by wearing or using the XR terminal. The XR terminal may access a network in a wireless or wired manner, for example, by using a Wi-Fi or 5G system.

The terminal device may be fixed or mobile. This is not limited in embodiments of this application.

In embodiments of this application, an apparatus configured to implement a function of a terminal device may be a terminal device; or may be an apparatus, for example, a chip system, that can support the terminal device in implementing the function. The apparatus may be installed in the terminal device. In embodiments of this application, the chip system may include a chip, or may include a chip and another discrete component.

2. Network Device

The network device may be an access network device. The access network device may also be referred to as a radio access network (radio access network, RAN) device, and is a device that provides a wireless communication function for the terminal device. For example, the network device includes but is not limited to: a next-generation base station (generation NodeB, gNB) in 5G, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a transmission reception point (transmission reception point, TRP), a transmission point (transmission point, TP), and a mobile switching center. Alternatively, the network device may be a radio controller, a central unit (central unit, CU), and/or a distributed unit (distributed unit, DU) in a cloud radio access network (cloud radio access network, CRAN) scenario, or the network device may be a relay station, an access point, a vehicle-mounted device, a terminal device, a wearable device, a network device in a future 5G network, a network device in a future evolved PLMN network, or the like. The terminal device may communicate with a plurality of network devices using different technologies. For example, the terminal device may communicate with a network device supporting long term evolution (long term evolution, LTE), may communicate with a network device supporting 5G, or may implement dual connectivity with a network device supporting LTE and a network device supporting 5G. This is not limited in embodiments of this application.

In embodiments of this application, an apparatus configured to implement functions of the network device may be a network device, or may be an apparatus, for example, a chip system, that can support the network device in implementing the functions. The apparatus may be installed in the network device.

3. Air Interface

An air interface is a Uu interface, and may be referred to as Uu for short. The Uu air interface is used for communication between the terminal device and the network device. Transmission over the Uu air interface may include uplink transmission and downlink transmission.

The uplink transmission means that the terminal device sends information to the network device, and the information in the uplink transmission may be referred to as uplink information or an uplink signal. The uplink information or the uplink signal may include one or more of an uplink data signal, an uplink control signal, and a sounding reference signal (sounding reference signal, SRS). A channel used to transmit the uplink information or the uplink signal is referred to as an uplink channel, and the uplink channel may include one or more of a physical uplink data channel (physical uplink shared channel, PUSCH) and a physical uplink control channel (physical uplink control channel, PUCCH). The PUSCH is used to carry uplink data, and the uplink data may also be referred to as the uplink data information. The PUCCH is used to carry uplink control information (uplink control information, UCI) fed back by the terminal device. For example, the UCI may include one or more of channel state information (channel state information, CSI), an ACK, a NACK, and the like that are fed back by the terminal device.

The downlink transmission means that the network device sends information to the terminal device, and the information in the downlink transmission may be downlink information or a downlink signal. The downlink information or the downlink signal may include one or more of a downlink data signal, a downlink control signal, a channel state information reference signal (channel state information reference signal, CSI-RS), and a phase tracking reference signal (phase tracking reference signal, PTRS). A channel used to transmit downlink information or a downlink signal is referred to as a downlink channel, and the downlink channel may include one or more of a physical downlink data channel (physical downlink shared channel, PDSCH)

and a physical downlink control channel (physical downlink control channel, PDCCH). The PDCCH is used to carry downlink control information (downlink control information, DCI), and the PDSCH is used to carry downlink data (data). The downlink data may also be referred to as downlink data information.

4. XR service and XR experience Data of an XR service includes one or more of VR data, AR data, MR data, video data, audio data, or picture data. The XR service may be considered as a fourth-type service in a post-5G or 6G communication system, and may be referred to as a fourth-pole service for short. An enhanced mobile broadband (enhanced mobile broadband, eMBB) service has a high requirement on a data rate, a massive machine type communication (massive machine type communication, mMTC) service has a high requirement on coverage and a capacity, and an ultra-reliable low-latency communication (ultra-reliable low-latency communication, URLLC) service has a high requirement on a latency and reliability. However, the XR service has a requirement for a low delay and a high rate. The XR service focuses on user experience, which may also be referred to as XR experience. The XR experience includes immersive experience, visual experience, interaction experience, device experience, or the like. The XR experience may be evaluated from a plurality of different dimensions, for example, including one or more of the following dimensions: image definition, image smoothness, image distortion, image stereoscopy, image black borders, image smearing, sound quality, sound effect, angle of view, freezing, artifacts, dizziness, audio and video synchronization, interaction freedom, interaction operation response speed, interaction operation precision, interaction content loading speed, terminal wearing comfort, terminal wearing fatigue, terminal battery life, terminal portability, terminal visual impairment friendliness, or the like. Evaluating the XR experience and identifying experience bottlenecks promotes optimization of network transmission, XR source content, and terminals, and can effectively promote development of an end-to-end industry.

When transmission of the XR data has a large delay or a low rate, the user may sense phenomena such as black borders and freezing in viewing, resulting in poor visual experience of the user. In this application, advantages and disadvantages of the XR experience may be quantified by using an XR experience value. For example, if the XR experience value is high, user experience is good; or if the XR experience value is low, user experience is poor. Further, a threshold may be set for the XR experience value, and the threshold may represent an XR experience requirement. It should be noted that, in embodiments of this application, the XR experience and the XR experience value are sometimes used alternately, but a person skilled in the art may understand the meanings thereof.

Current communication systems aim to maximize a throughput. Based on this, there may be the following cases.

First, in a current technology, a principle of maximizing a throughput is used for data scheduling transmission, and a pairing principle and a scheduling transmission manner that support multi-user multiple-input multiple-output (multi-user multiple-input multiple-output, MU-MIMO) are as follows: Terminal devices that meet a signal to interference plus noise ratio requirement participate in pairing. It is assumed that a terminal device A and a terminal device B participate in pairing. A rate of independently scheduling the terminal device A is 100 megabits per second (Mbps), and a rate of independently scheduling the terminal device B is also 100 Mbps. When the terminal device A and the terminal device B are paired, a sum rate of scheduling the terminal device A and the terminal device B at the same time based on the principle of maximizing the throughput is 160 Mbps. In this case, due to impact of mutual interference between the terminal device A and the terminal device B, the rates are reduced. For example, rates of respectively scheduling the terminal device A and the terminal device B are reduced to 80 Mbps. Consequently, XR experience of the terminal device A and the terminal device B may deteriorate. Therefore, in comparison with independently scheduling any terminal device, when the terminal device A and the terminal device B are paired for scheduling, a rate of scheduling any terminal device decreases. For example, if the data of the XR service is video data, phenomena such as video freezing and black borders may occur, thereby affecting subjective experience (an XR experience value) of a user. When the corresponding XR experience value decreases to a threshold, a quantity of XR users satisfied with the XR experience eventually decreases.

In addition, a block error rate (block error rate, BLER) indicator of transmission is determined based on a quality of service (quality of service, QoS) requirement configured on a core network side, including an initial transmission BLER and a retransmission BLER. An initial modulation and coding (modulation and coding scheme, MCS) index is selected and a scheduling resource is allocated for each transport block of a terminal device based on the BLER indicator and channel state information (channel state information, CSI) fed back by the terminal device. Subsequently, an MCS is adjusted based on CSI information fed back by the terminal device and a statistical hybrid automatic repeat request (hybrid automatic repeat request, HARQ) feedback result, to ensure transmission correctness, and maximize system throughput. For example, it is assumed that the threshold of the XR experience value is A, the XR experience value of user equipment obtained by the network device at a current scheduling moment is B, and B<A. In a current technology, the network device determines the MCS index and allocation of the scheduling resource based on a CSI feedback. It is assumed that the CSI feedback indicates that the MCS index increases from 20 to 25. In this case, a possible consequence is that the BLER still cannot meet a corresponding XR experience requirement, and even the XR experience value decreases from B to C, that is, C<B<A. Consequently, the quantity of XR users satisfied with the XR experience eventually decreases.

An XR service usually has a higher priority than a common service. Therefore, for the XR service, the foregoing problem in the communication system, that the XR experience is poor and the quantity of users of the XR service satisfied with the XR experience decreases due to the single objective of maximizing the throughput, needs to be resolved.

For particularity of the XR service compared with the common service, an evaluation parameter of the XR experience may be defined. The evaluation parameter of the XR experience may include network transmission quality information used to evaluate communication quality of data of the XR service (XR data for short hereinafter) during network transmission, or in other words, used to evaluate the communication quality of the XR data on the network side. The network transmission includes RAN transmission and core network transmission. The network side includes a RAN and a core network. In embodiments of this application, the network transmission quality information may also be referred to as (or include) an XR quality index (XR quality index, XQI). The network transmission quality information uses technical statistics that can be obtained during network transmission to fit impact of the network transmission side on a subjective experience score of a user. In this way, impact of the network transmission side on the XR experience can be evaluated, and operators can use this indicator to guide network upgrade, networking, and network construction. For example, the technical statistics that can be obtained by the network transmission side include: a packet error rate (packet error rate, PER) and/or a BLER, a packet delay budget (Packet Delay Budget, PDB), a delay jitter value, retransmission information, a transmission rate, and the like. When a source rate or a network transmission rate is given, a method for calculating the network transmission quality information may be defined as follows: Network transmission quality information=f(PER, PDB, delay jitter, retransmission information), where f( ) represents a function expression. The network transmission quality information can provide an evaluation manner more flexible than evaluating the XR experience directly based on whether the PER and/or the BLER and the PDB are met. In embodiments of this application, it may be considered that the XR experience is mainly reflected by the network transmission quality information. Therefore, in embodiments of this application, the network transmission quality information (sometimes referred to as the XQI) may include the XR experience value (or referred to as an XQI experience value), or the network transmission quality information (sometimes referred to as an XQI) and the XR experience value may be interchanged sometimes. A threshold that is set for the XR experience value, namely, an XR experience requirement, may also be referred to as a network transmission quality information threshold (or an XQI threshold), representing a network transmission quality requirement (or an XQI requirement). In addition, the network transmission quality information is essentially communication quality of XR data in a network sensed by a terminal device, and the XR experience is essentially experience of the terminal device in XR data communication. Therefore, the network transmission quality information and the XR experience may also be referred to as network transmission quality information of the terminal device and XR experience of the terminal device.

Based on this, the following embodiments of this application provide several communication methods and apparatuses that may be used in any communication architecture in FIG. 1 to FIG. 4. According to the following embodiments, a network device may manage data communication with user equipment based on at least the network transmission quality information, fully consider the XR experience, and improve the XR experience as much as possible, further to increase the quantity of XR users satisfied with the XR experience.

Figure 5:
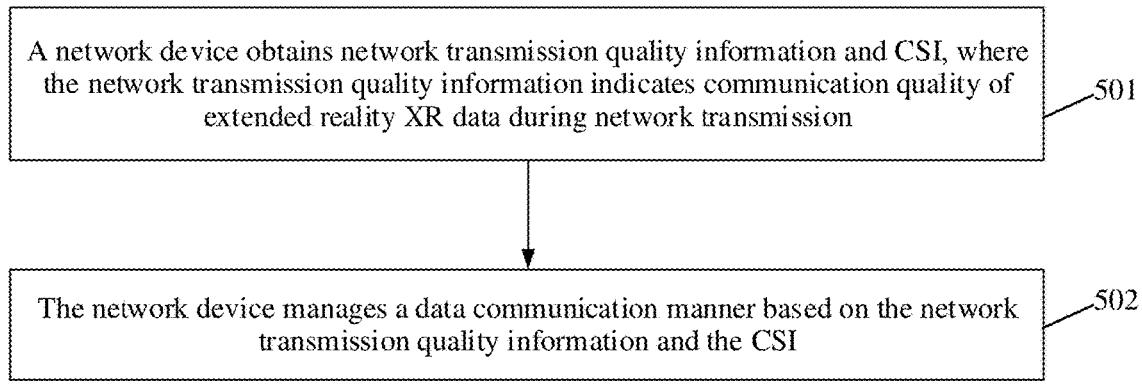
FIG. 5 is a schematic flowchart of a communication method according to at least one embodiment of this application.

FIG. 5 shows a communication method according to this application. Subsequent embodiments of this application may provide descriptions in detail based on the communication method.

Step 501: A network device obtains network transmission quality information and channel state information (channel state information, CSI), where the network transmission quality information indicates communication quality of XR data during network transmission.

Step 502: The network device manages a data communication manner based on the network transmission quality information and the CSI.

Herein, an object managed by the network device may be a terminal device. In other words, the network device manages a manner of data communication with the terminal device.

Correspondingly, the terminal device accepts management performed by the network device on the data communication manner. This management on the data communication manner may be embodied through communication between the network device and the terminal device.

In step 501, a manner of obtaining the network transmission quality information by the network device may be receiving the network transmission quality information sent by the terminal device, may be receiving a parameter (for example, at least one of the foregoing PER, PDB, delay jitter value, retransmission information, and transmission rate) that is sent by the terminal device and that is related to calculation of the network transmission quality information and then obtaining the network transmission quality information through calculation of the network device, may be receiving the network transmission quality information sent by a core network, or may be another manner. This is not limited in the solution of some embodiments. A manner of obtaining the CSI by the network device may be similar to a manner of obtaining the CSI by the network device in a current technology. For example, the network device receives the CSI sent by the terminal device, where the CSI is obtained by the terminal device by measuring a reference signal sent by the network device.

A specific implementation of step 502 is described below by using Embodiment 1 to Embodiment 4. It should be noted that Embodiment 1 to Embodiment 4 may include all content related to the communication method in FIG. 5.

Embodiment 1

In this embodiment, in step 502, the network device manages the data communication manner, where the data communication manner may include a data communication manner that is based on multiple-input multiple-output (multiple-input multiple-output, MIMO). In other words, in step 502, the network device may determine, based on the network quality transmission information and the CSI, a data communication manner used when performing data communication with the terminal device by using MIMO. The data communication includes at least XR data communication. Because MIMO communication may include MU-MIMO communication and single-user multiple-input multiple-output (single-user multiple-input multiple-output, SU-MIMO) communication, in an implementation, the network device may determine pairing between different users based on MU-MIMO (for example, a pairing criterion between different users), a scheduling sequence for different terminal devices based on SU-MIMO, and the like.

Figure 6:
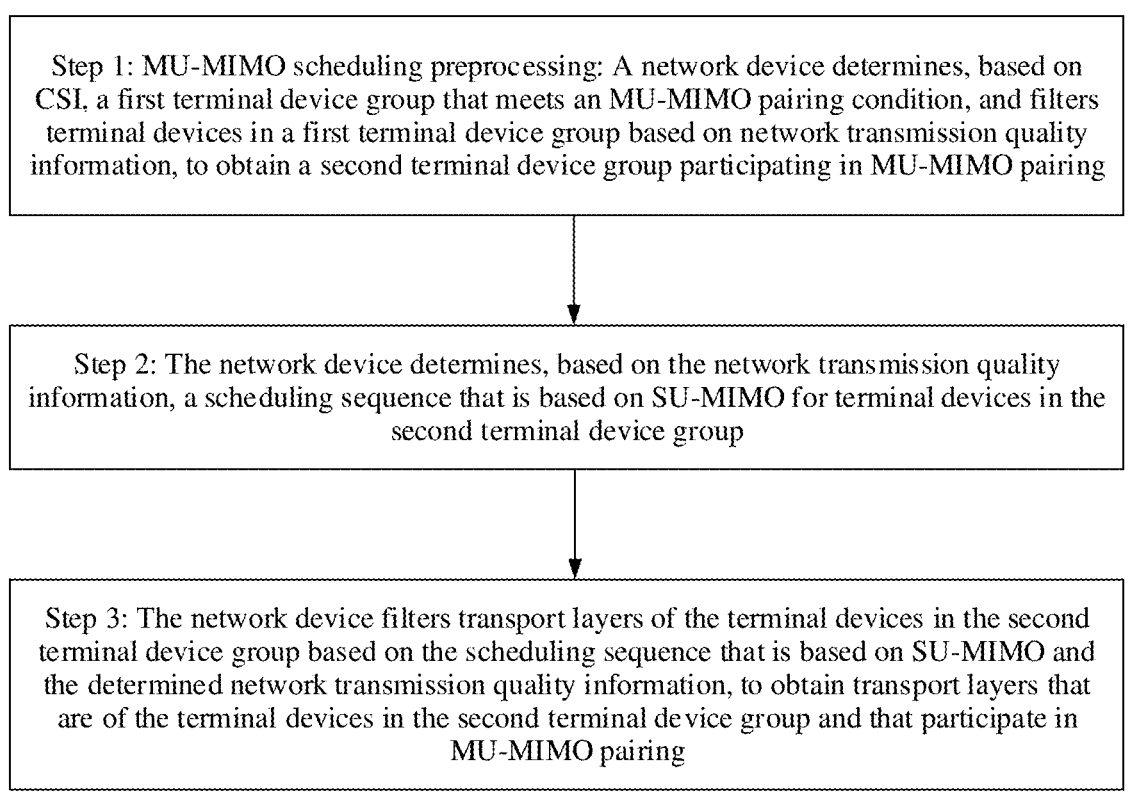
FIG. 6 is a schematic flowchart of a communication method according to at least one embodiment of this application.

The following describes related content of step 502 in detail with reference to FIG. 6.

That the network device manages, based on the network transmission quality and the CSI, the MIMO data communication manner mainly includes the following three steps.

Step 1: The network device determines, based on the CSI, a first terminal device group that meets an MU-MIMO pairing condition, and filters terminal devices in the first terminal device group based on the network transmission quality information, to obtain a second terminal device group participating in MU-MIMO pairing.

In an implementation, the network device determines, based on the CSI (or an uplink reference signal sent by the terminal device), correlation between downlink channels of terminal devices in a user equipment service, and filters the terminal devices based on beam information of the terminal devices, to exclude terminal devices that do not meet a basic condition for MU-MIMO pairing. The pairing means that: if different users transmit data on a same time-frequency resource in a spatial multiplexing manner, it may be referred to that the different users are paired on the same time-frequency resource. For example, the basic condition for MU-MIMO pairing may be that correlation between downlink channels of different terminal devices is less than a correlation threshold. Terminal devices that meet the basic condition for MU-MIMO pairing and that are obtained through filtering in this way may be grouped into the first terminal device group. On this basis, the network device further filters the terminal devices in the first terminal device group based on the network transmission quality information. For example, a threshold (a network transmission quality requirement) may be set for the network transmission quality information. The terminal device can be allowed to participate in MU-MIMO pairing, only when a network transmission quality information corresponding to a terminal device meets the threshold. In this way, terminal devices that are obtained through further filtering and that are allowed to participate in MU-MIMO pairing are grouped into the second terminal device group. The network device may further determine a quantity of initial transport layers and/or a rank of the initial transport layers of the terminal device in the second terminal device group before the terminal device participates in MU-MIMO pairing. In a MIMO scenario, a quantity of codewords may not be equal to the quantity of layers. A process of mapping a codeword to a layer is layer mapping. The "layer" herein is the transport layer. One transport layer corresponds to one radio transmit mode. A quantity of used transport layers is referred to as the rank.

This step may be considered as preprocessing of MU-MIMO scheduling.

Step 2: The network device determines, based on the network transmission quality information, a scheduling sequence that is based on SU-MIMO for the terminal devices in the second terminal device group. In other words, the network device determines scheduling priorities of the terminal devices in the second terminal device group.

In an implementation, if the communication quality of the XR data during network transmission indicated by the network transmission quality information of the terminal device is poor (the XR experience value is low), it indicates that XR experience urgently needs to be improved, and the network device may preferentially schedule the terminal device, or in other words, a scheduling priority based on SU-MIMO of the terminal device is high, or a scheduling sequence that is based on SU-MIMO of the terminal device is ranked first. Based on a similar rule, the network device completes SU-MIMO scheduling sorting on the terminal devices in the second terminal device group. A specific SU-MIMO scheduling procedure is similar to an existing mechanism, and details are not described in this embodiment of this application.

In an implementation, the network device updates, based on the determined SU-MIMO scheduling sequence, a quantity of transport layers that are of the terminal devices in the second terminal device group and that participate in MU-MIMO pairing.

Step 3: The network device filters the transport layers of the terminal devices in the second terminal device group based on the scheduling sequence that is based on SU-MIMO and the network transmission quality information that are determined in step 2, to obtain transport layers that are of the terminal devices in the second terminal device group and that participate in MU-MIMO pairing.

In an implementation, the network device traverses resource block groups (resource block groups, RBGs) allocated to the terminal devices in the second terminal device group and transport layers of the terminal devices. For the transport layers of the terminal devices, when a terminal device uses different transport layers, the network device separately obtains estimated network transmission quality information corresponding to the different transport layers based on the RBGs and current network transmission quality information of the terminal device. Then the network device separately filters the transport layers based on whether estimated network transmission quality information corresponding to the different transport layers meets a preset threshold, to obtain transport layers participating in pairing. If the estimated network transmission quality information meets the preset threshold, the corresponding used transport layer can participate in MU-MIMO pairing. In an implementation, the network device updates a quantity of transport layers and/or a rank of transport layers that are of the terminal devices in the second terminal device group and that participate in MU-MIMO pairing.

The network device performs MIMO data communication with the terminal device based on the foregoing three steps. Correspondingly, that the terminal device accepts management performed by the network device on the data communication manner may be reflected in the MIMO data communication with the network device with reference to the foregoing steps.

In the foregoing technical solution, with reference to the network transmission quality information, the network device determines policies such as pairing and scheduling for performing MIMO data communication with the terminal device, aiming to maximize the XR experience, thereby effectively improving the XR experience, and ensuring a quantity of XR users satisfied with the XR experience.

Based on the foregoing content, a specific implementation example is provided herein, to intuitively reflect beneficial effects of Embodiment 1.

In the current technology, a manner of pairing two terminal devices based on MU-MIMO is as follows.

Figure 7:
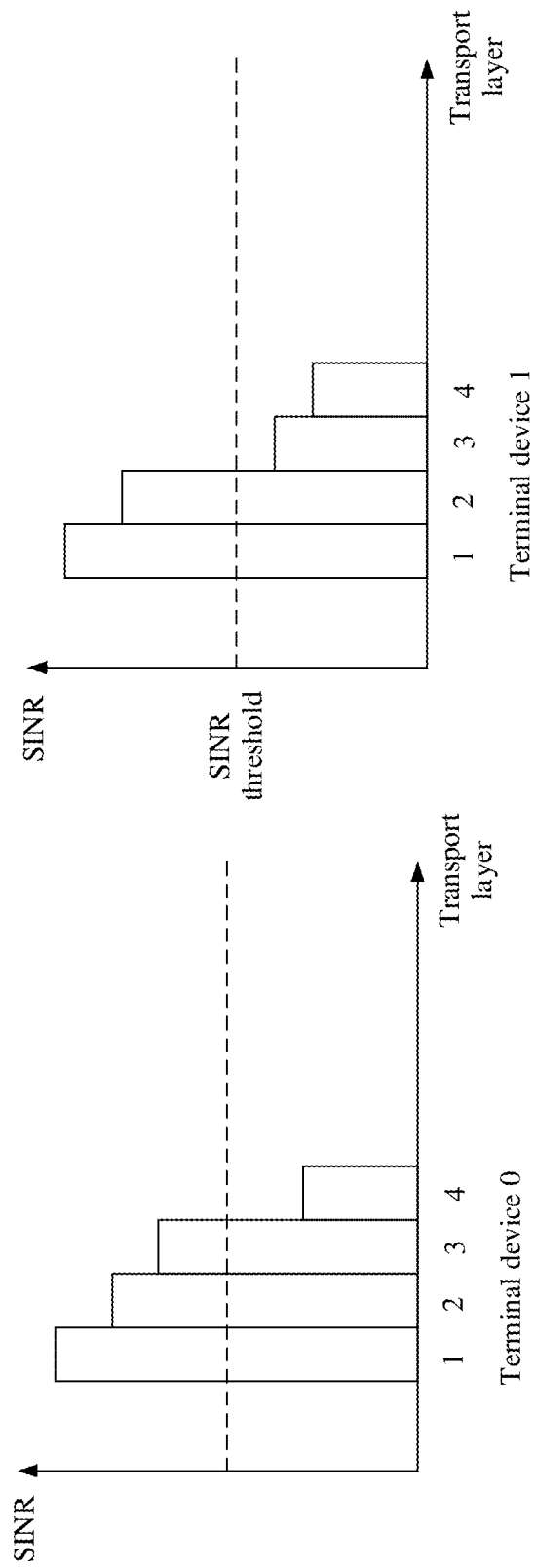
FIG. 7 is a schematic diagram of multi-user multiple-input multiple-output (multi-user multiple-input multiple-output, MU-MIMO) pairing according to at least one embodiment of this application.

FIG. 7 shows signal to interference plus noise ratios (signal to interference plus noise ratios, SINRs) of transport layers of a terminal device 0 and a terminal device 1 before pairing. When MU-MIMO pairing is performed based on a criterion of maximizing a throughput, when three transport layers of the terminal device 0 participate in pairing, a system throughput is largest. To be specific, transport layers of the terminal device 0 selected based on the criterion of maximizing the throughput is three layers, namely, transport layers 1, 2, and 3. When two transport layers of the terminal device 1 participate in pairing, a system throughput is largest. In other words, transport layers of the terminal device 1 selected based on the criterion of maximizing the throughput is two layers, namely, transport layers 1 and 2.

Figure 8:
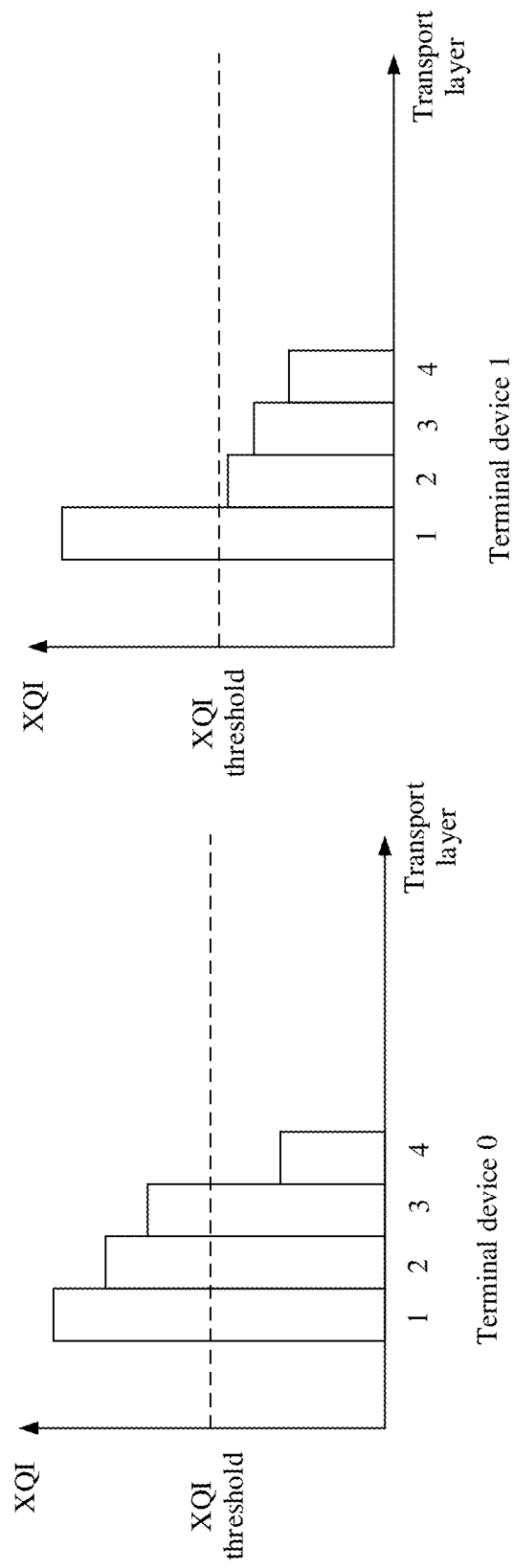
FIG. 8 is a schematic diagram of another MU-MIMO pairing according to at least one embodiment of this application.

FIG. 8 shows estimated network transmission quality information of the terminal device before each transport layer of the terminal device 0 and the terminal device 1 participates in pairing. Herein, an XQI is used as an example to perform MU-MIMO pairing in a manner in this embodiment of this application. When three transport layers of the terminal device 0 participate in pairing, a quantity of terminal devices satisfied with XR experience in a system is largest, the terminal device 0 meets an XR experience requirement (the XQI is higher than a preset threshold), and resources (for example, time-frequency resources and/or space domain resources) that can participate in MU-MIMO pairing are largest. In this case, three transport layers of the terminal device 0, namely, transport layers 1, 2, and 3, are selected. When one transport layer of the terminal device 1 participates in pairing, a quantity of users satisfied with XR experience in a system is largest, the terminal device 1 meets an XR experience requirement (the XQI is higher than a preset threshold), and resources (for example, time-frequency resources and/or space domain resources) that can participate in MU-MIMO pairing are largest. In this case, one transport layer of the terminal device 1, namely, a transport layer 1, is the selected.

It can be learned from the foregoing comparison that, if the existing scheduling criterion of maximizing the throughput is used to schedule the terminal device 0 and the terminal device 1, three transport layers of the terminal device 0 participate in pairing, and two transport layers of the terminal device 1 participate in pairing. In this case, XR experience of the terminal device 1 decreases, and a preset XR experience threshold is not met. Consequently, a quantity of XR terminal devices satisfied with the XR experience decreases. Therefore, according to this embodiment of this application, experience of the XR terminal device is fully considered, so that a quantity of XR terminal devices satisfied with the XR experience can be greatly increased.

Embodiment 2

In Embodiment 1, layering source data transmitted from a network application layer is not considered. In a communication system, a scenario of layering source data may be further considered. The source data described herein refers to original bit data for generating XR data. Layers in the layering herein refer to two or more layers of data (which may also be referred to as two-stream or multi-stream data) that have a same feature or different features and that are obtained by a source end by processing original bit data of the XR data. The source end may process the original bit data of the XR data by using a plurality of methods such as spatial layering and quality layering to obtain the two or more layers of data. This is not limited herein. For example, when the source data is sent from a server to a core network, the source data is divided into two layers for sending, and the two layers are respectively a basic layer and an enhancement layer. In this way, the network can perform layered transmission based on importance of the data, and preferentially guarantee performance indicators of data transmission at the basic layer.

Embodiment 2 is a technical solution based on Embodiment 1 and the scenario of layering the source data. The solution may include all content in Embodiment 1. In other words, content that has been described in Embodiment 1 is not described in Embodiment 2.

When the source data is transmitted in layers, correspondingly, the network transmission quality information may also be correspondingly adjusted. In an implementation, the network transmission quality information may be divided into first network transmission quality information corresponding to the basic layer and second network transmission quality information corresponding to the enhancement layer that respectively indicate communication quality of the XR data at the basic layer during network transmission and communication quality of the XR data at the enhancement layer during network transmission. The network device may separately obtain the first network transmission quality information and the second network transmission quality information in a manner similar to the manner in which the network device obtains the network transmission quality information in step 501 described above. Certainly, the network device may first obtain total network transmission quality information in the foregoing manner in which the network device obtains the network transmission quality information, and then multiply the total network transmission quality information by weight coefficients of the basic layer and the enhancement layer respectively to obtain the first network transmission quality information and the second network transmission quality information.

In step 502, the network device manages the MIMO data communication manner based on the network transmission quality and the CSI mainly by using the following three steps in Embodiment 2.

Step 1: The network device determines, based on the CSI, a first terminal device group that meets an MU-MIMO pairing condition, and filters terminal devices in the first terminal device group based on at least one of the total network transmission quality information, the first network transmission quality information, and the second network transmission quality information, to obtain a second terminal device group participating in MU-MIMO pairing.

In an implementation, the network device obtains the first terminal device group, the second terminal device group, and other related information in a manner similar to the manner (step 1) in Embodiment 1. Details are not described herein again. The network transmission quality information in step 1 in Embodiment 1 may be replaced with the total network transmission quality information in Embodiment 2. In addition, when the network device receives the first network transmission quality information and the second network transmission quality information, the network device may first fit the first network transmission quality information and the second network transmission quality information into third network transmission quality information (for example, the total network transmission quality information) that can reflect overall communication quality of the XR data during network transmission, to replace the network transmission quality information in step 1 in Embodiment 1. Optionally, a fitting manner may be that the first network transmission quality information and the second network transmission quality information are separately multiplied by a weight coefficient and then added up.

In another implementation, the network device obtains the first terminal device group in a manner similar to the manner (step 1) in Embodiment 1. Details are not described herein again. In this implementation, because layered data transmission is considered, terminal devices in the second terminal device group participating in MU-MIMO pairing may specifically include a terminal device that meets one of the following requirements: a terminal device whose basic layer and enhancement layer can both participate in MU-MIMO pairing, a terminal device whose basic layer can participate in MU-MIMO pairing, and a terminal device whose enhancement layer can participate in MU-MIMO pairing A manner in which the network device obtains, through filtering, a terminal device that meets the foregoing requirement from the second terminal device group may be specifically as follows: The network device sets a first threshold (a first network transmission quality requirement) for the first network transmission quality information, and the base layer corresponding to the terminal device can be allowed to participate in MU-MIMO pairing only when the network transmission quality information corresponding to the terminal device meets the first threshold; and the network device sets a second threshold (a second network transmission quality requirement) for the second network transmission quality information corresponding to the terminal device, and the enhancement layer corresponding to the terminal device can be allowed to participate in MU-MIMO pairing only when the second network transmission quality information corresponding to the terminal device meets the second threshold. In this way, judgments are respectively performed on basic layers and enhancement layers corresponding to the terminal devices in the first terminal device group, to obtain terminal devices that meet the foregoing requirements, and the terminal devices are classifies into the second terminal device group. If first network transmission quality information and second network transmission quality information corresponding to a terminal device do not meet the first threshold and the second threshold respectively, the terminal device is removed from the second terminal device group. Optionally, the network device may further determine a quantity of initial transport layers and/or a rank of initial transport layers of the terminal device in the second terminal device group before the terminal device participates in MU-MIMO pairing. Herein, the initial transport layer includes an initial transport layer corresponding to the basic layer of the source data and/or an initial transport layer corresponding to the enhancement layer of the source data.

Step 2: The network device obtains, based on at least one of the total network transmission quality information, the first network transmission quality information, and the second network transmission quality information, a scheduling sequence that is based on SU-MIMO for the terminal devices in the second terminal device group.

In an implementation, for different terminal devices in the second terminal device group, if communication quality, indicated by the total network transmission quality information of the terminal device, of XR data during network transmission is poor (for example, an XR experience value is low), it indicates that the terminal device urgently needs to improve XR experience, and the network device may preferentially schedule the terminal device, that is, a scheduling priority of the terminal device is high, or a scheduling sequence that is based on SU-MIMO of the terminal device is ranked first; and/or for a terminal device in the second terminal device group, base-layer data communication may be preferentially ensured, in other words, if base-layer communication quality, indicated by the first network transmission quality information, of XR data during network transmission is poor (for example, a base-layer XR experience value is low), the network device may preferentially schedule base-layer data communication of the terminal device, that is, a scheduling priority of base-layer data of the network device is high, and a scheduling sequence that is based on SU-MIMO of the base layer is ranked first. Based on the foregoing similar rule, the network device completes SU-MIMO scheduling sorting on the terminal devices in the second terminal device group and the basic layers and the enhancement layers of the terminal devices. A specific SU-MIMO scheduling procedure is similar to an existing mechanism, and details are not described in this embodiment of this application.

In an implementation, the network device determines, based on the determined SU-MIMO scheduling sequence, a quantity of transport layers that are of the terminal devices in the second terminal device group and that participate in MU-MIMO pairing, where the transport layers correspond to the layered data.

Step 3: The network device filters first transport layers and/or second transport layers of the terminal devices in the second terminal device group based on the scheduling sequence that is based on SU-MIMO and at least one of the total network transmission quality information, the first network transmission quality information, and the second network transmission quality information in step 2, to obtain third transport layers and/or fourth transport layers. (For example, when both basic layers and enhancement layers of the terminal devices in the second terminal device group are allowed to participate in MU-MIMO pairing in step 1, the network device filters the first transport layers and/or the second transport layers of the terminal device in the second terminal device group, to obtain third transport layers and fourth transport layers that are of the terminal devices in the second terminal device group and that participate in MU-MIMO pairing; when basic layers of the terminal devices are allowed to participate in MU-MIMO pairing in step 1, the network device filters the first transport layers of the terminal devices in the second terminal device group, to obtain third transport layers that are of the terminal device and that participate in MU-MIMO pairing; or when enhancement layers of the terminal devices are allowed to participate in MU-MIMO pairing in step 1, the network device filters the second transport layers of the terminal devices in the second terminal device group, to obtain fourth transport layers that are of the terminal devices in the second terminal device group and that participate in MU-MIMO pairing.) The first transport layer and the third transport layer correspond to the basic layer of the source data, and the second transport layer and the fourth transport layer correspond to the enhancement layer of the source data.

Figure 9:
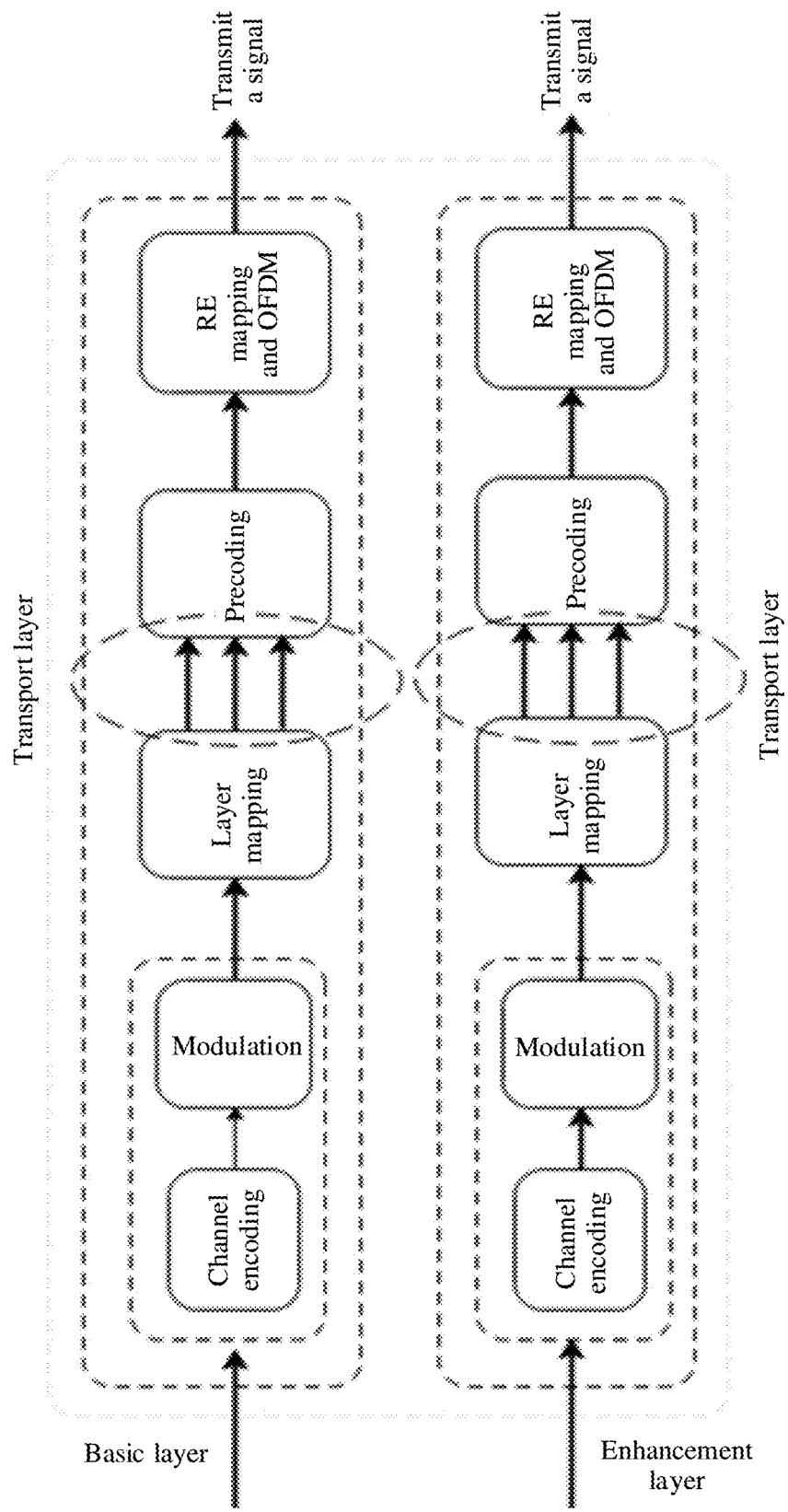
FIG. 9 is a schematic diagram of a relationship between a basic layer, an enhancement layer, and a transport layer according to at least one embodiment of this application.

In an implementation, the network device traverses the RBGs allocated to the terminal devices in the second terminal device group and transport layers corresponding to layered data transmission of the terminal devices, that is, a transport layer corresponding to the basic layer of the source data and/or a transport layer corresponding to the enhancement layer of the source data. The correspondence herein means that: layered data (the basic layer of the source data or the enhancement layer of the source data) is transmitted by using one or more transport layers between the network device and the terminal device. For a relationship between the basic layer, the enhancement layer, and the transport layer, refer to FIG. 9. FIG. 9 shows a processing process on the network device side before sending the data. Channel coding and modulation may be separately performed on the source data by using the basic layer and the enhancement layer. The source data may be mapped to one or more transport layers (three transport layers are used as an example in the figure) corresponding to the source data through layer mapping, and then mapped to an OFDM symbol through precoding and RE. Finally, a signal is transmitted. After corresponding data is transmitted to the terminal device side, the terminal device side performs an inverse operation corresponding to operations on the network device side. Details are not described again. Judgments and filtering are separately performed on transport layers of the basic-layer data and the enhancement-layer data of the terminal device. For example, for the transport layers corresponding to the basic layer, when the terminal device uses different transport layers, estimated network transmission quality information corresponding to the different transport layers is separately obtained based on the RBGs and current total network transmission quality information of the terminal device, and judgments are separately performed depending whether corresponding estimated network transmission quality information at different transport layers meets a preset threshold. Alternatively, when the terminal device uses different transport layers, first estimated network transmission quality information corresponding to different transport layers is separately obtained based on the RBGs and current first network quality information of the terminal device, and judgments are separately performed depending on whether corresponding first estimated network transmission quality information of different transport layers meets a preset threshold. Only transport layers corresponding to layered data (namely, base-layer source data) of the terminal device that meets the preset threshold can participate in MU-MIMO pairing. The filtering of the transport layers corresponding to the enhancement layer is similar to the filtering of the transport layers corresponding to the basic layer, and details are not described herein again. In an implementation, the network device updates a quantity of transport layers and/or a rank of transport layers that are of the terminal device in the second terminal device group and that participate in MU-MIMO pairing. Herein, the transport layer includes a transport layer corresponding to the basic layer of the source data and/or a transport layer corresponding to the enhancement layer of the source data.

The network device performs MIMO data communication with the terminal device based on the foregoing three steps. Correspondingly, that the terminal device accepts management performed by the network device on the data communication manner may be reflected in the MIMO data communication with the network device with reference to the foregoing steps.

According to the foregoing technical solution, in a scenario in which the source data is layered, by comprehensively considering the total network transmission quality information and/or network transmission quality information of each layer, the network device determines policies such as pairing and scheduling for performing MIMO data communication with the terminal device, aiming to maximize the XR experience, thereby effectively improving the XR experience, and ensuring the quantity of XR users satisfied with the XR experience.

Based on the foregoing content, a specific implementation example is provided herein, to intuitively reflect beneficial effects of Embodiment 2.

In the current technology, in a scenario in which the source data is layered, a manner of pairing two terminal devices based on MU-MIMO is as follows.

Figure 10:
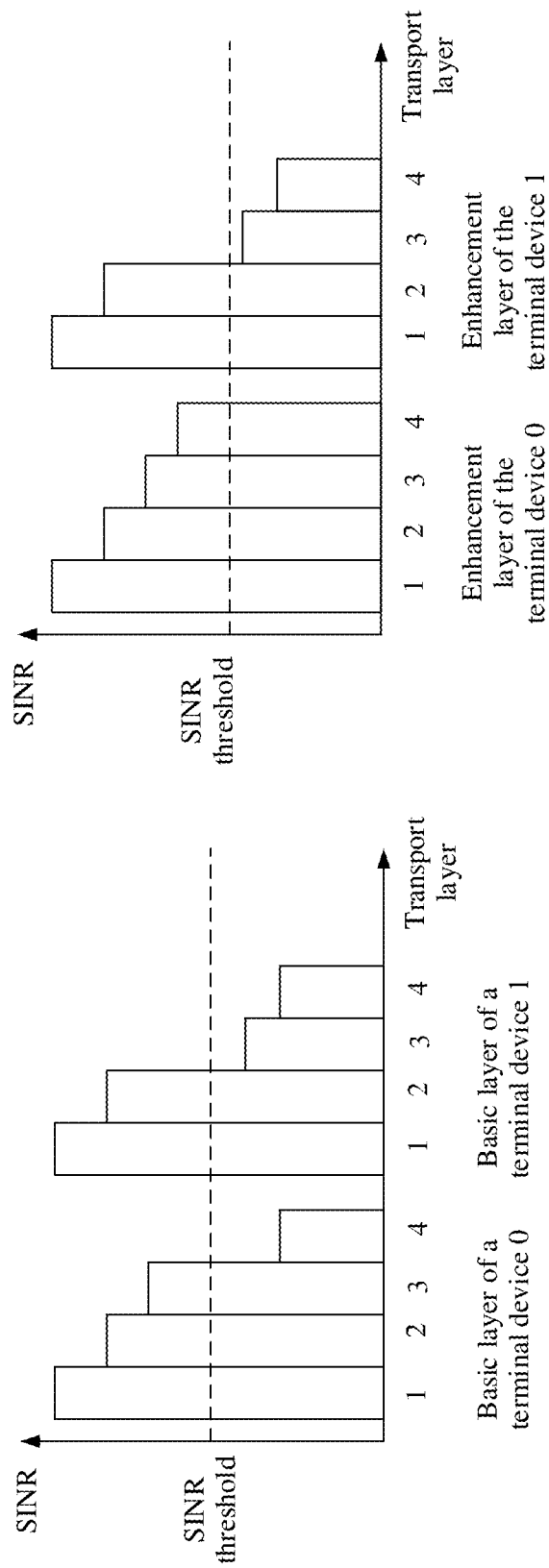
FIG. 10 is a schematic diagram of MU-MIMO pairing in a case of source data layering according to at least one embodiment of this application.

FIG. 10 shows SNIRs of layers of layered data of the terminal device 0 and the terminal device 1 before pairing. When MU-MIMO pairing is performed based on a criterion of maximizing a throughput, and three transport layers corresponding to basic-layer source data of the terminal device 0 participate in pairing, a system throughput is largest. In other words, three transport layers, namely, transport layers 1, 2, and 3, corresponding to the basic layer of the terminal device 0 are selected based on the criterion of maximizing the throughput. When four transport layers corresponding to enhancement-layer source data of the terminal device 0 participate in pairing, a system throughput is largest. In other words, four transport layers, namely, transport layers 1, 2, 3, and 4, corresponding to the enhancement layer of the terminal device 0 are selected based on the criterion of maximizing the throughput. When two transport layers corresponding to basic-layer source data of the terminal device 1 participate in pairing, a system throughput is largest. In other words, two transport layers, namely, transport layers 1 and 2, corresponding to the basic layer of the terminal device 1 are selected based on the criterion of maximizing the throughput. When two transport layers corresponding to enhancement-layer source data of the terminal device 1 participate in pairing, a system throughput is largest. In other words, two transport layers, namely, transport layers 1 and 2, corresponding to the enhancement layer of the terminal device 1 are selected based on the criterion of maximizing the throughput.

Figure 11:
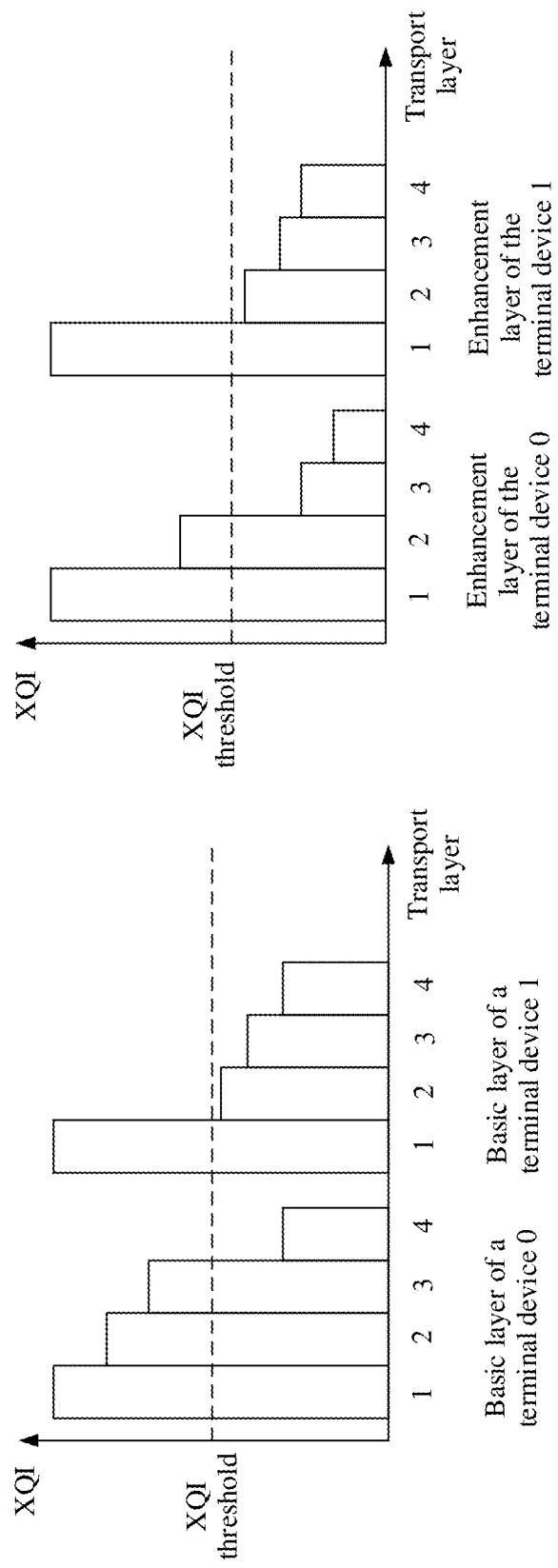
FIG. 11 is a schematic diagram of another MU-MIMO pairing in a case of source data layering according to at least one embodiment of this application.

FIG. 11 shows estimated network transmission quality information of each layer of the layered data of the terminal device 0 and the terminal device 1 before pairing. Herein, an XQI is used as an example, and MU-MIMO pairing is performed in the manner in this embodiment of this application. When three transport layers corresponding to the basic-layer source data of the terminal device 0 participate in pairing, and three transport layers corresponding to the enhancement-layer source data of the terminal device 0 participate in pairing, a quantity of terminal devices satisfied with XQI experience in the system is largest, the basic layer and the enhancement layer of the terminal device 0 respectively meet a layered XR experience requirement (for example, a requirement that the XQI is higher than a preset threshold), and resources (for example, time-frequency resources and/or space domain resources) that can participate in MU-MIMO pairing is largest. In this case, three transport layers corresponding to the base-layer source data, namely, transport layers 1, 2, and 3 corresponding to the base-layer source data, of the terminal device 0 are selected, and two transport layers corresponding to the enhancement-layer source data, namely, transport layers 1 and 2 corresponding to the enhancement layer, of the terminal device 0 are selected. When one transport layer corresponding to the basic-layer source data of the terminal device 1 participates in pairing, and one transport layer corresponding to the enhancement-layer source data of the terminal device 1 participates in pairing, a quantity of terminal devices satisfied with XR experience in the system is largest, the basic layer and the enhancement layer of the terminal device 1 respectively meet a layered XR experience requirement (for example, a requirement that the XQI is higher than a preset threshold), and resources (for example, time-frequency resources and/or space domain resources) that can participate in MU-MIMO pairing is largest. In this case, one transport layer corresponding to the base-layer source data, namely, transport layer 1 corresponding to the base-layer source data, of the terminal device 1 is selected, and one transport layer corresponding to the enhancement layer source data, namely, transport layer 1 corresponding to the enhancement-layer source data, of the terminal device 1 is selected.

It can be learned from the foregoing comparison that, if the existing scheduling criterion of maximizing the throughput is used to schedule the terminal device 0 and the terminal device 1, three transport layers corresponding to the basic-layer source data of the terminal device 0 participate in pairing, four transport layers corresponding to the enhancement-layer source data of the terminal device 0 participate in pairing, two transport layers corresponding to the basic-layer source data of the terminal device 1 participate in pairing, and two transport layers corresponding to the enhancement-layer source data of the terminal device 1 participate in pairing. In this case, XR experience of the terminal device 0 is reduced, and XR experience of the terminal device 1 is severely reduced, or even the XR experience does not meet the preset XQI threshold. Consequently, the quantity of terminal devices satisfied with the experience decreases. However, in this embodiment of this application, the experience of the XR terminal device is fully considered, and the quantity of terminal devices satisfied with the XR experience can be greatly increased.

Embodiment 3

This embodiment may be combined with any one of the foregoing embodiments and all content in the communication method in FIG. 5.

Based on the communication method in FIG. 5, in this embodiment, in step 502, the network device manages a data communication manner, where the data communication manner may include a manner of determining an MCS and/or a resource scheduling of data communication.

Step 502 includes: The network device determines an initial MCS index of the data communication based on the network transmission quality information and the CSI, adjusts the MCS index of the data communication, and/or determines a resource scheduling priority of the data communication. The data communication includes at least XR data communication.

Specifically, the network device may determine an initial MCS index of data communication, a scheduling priority of an initially allocated resource, and/or an initially allocated scheduling resource based on the network transmission quality information and the CSI (optionally, further based on at least one of a preset network transmission quality threshold and a BLER target).

Subsequently, as the network transmission quality information dynamically changes, the network device may adjust the MCS index of data communication based on currently obtained network transmission quality information. For example, the preset network transmission quality information threshold is 3, an XR experience value included in (corresponding to) the currently obtained network transmission quality information is 2.5, the current MCS index of data communication is 20, and an MCS index indicated in a CSI feedback obtained by the network device is 25. In this case, the network device should perform index reduction on the MCS of data communication, and preferentially consider a terminal device corresponding to the data communication during resource allocation, because XR experience corresponding to the terminal device is poor and does not meet a threshold. For another example, the preset network transmission quality threshold is 3, an XR experience value included in (corresponding to) the currently obtained network transmission quality information is 4.5, the current MCS index of data communication is 20, and an MCS index indicated in a CSI feedback obtained by the network device is 25. In this case, the network device may consider the MCS indicated in the CSI feedback to perform index raising on the current MCS of data communication.

The network device determines or adjusts, based on the foregoing principle, the MCS index and/or the resource scheduling priority for performing data communication with the terminal device. Correspondingly, that the terminal device accepts management performed by the network device on the data communication manner may be reflected in the data communication with the network device with reference to the foregoing content.

According to the foregoing technical solution, with reference to the network transmission quality information, the network device determines the MCS and/or resource scheduling manner of data communication, aiming to maximize the XR experience, thereby effectively improving the XR experience, and ensuring the quantity of XR users satisfied with the XR experience.

Embodiment 4

In Embodiment 3, a scenario in which source data transmitted from an application layer is layered is not considered. For this scenario and related content of the total network transmission quality information, the first network transmission quality information, and the second network transmission quality information derived from this scenario, refer to the descriptions in Embodiment 2. Details are not described in this embodiment. This embodiment may be combined with, or may include content of any one of the foregoing embodiments and all content in the communication method in FIG. 5.

Content in Embodiment 4 different from that in the foregoing embodiments is described below.

In this embodiment of this application, CSI may be correspondingly adjusted. In an implementation, the CSI may be divided into first CSI corresponding to the basic layer and second CSI corresponding to the enhancement layer, and the terminal device may separately feed back the first CSI and the second CSI.

In a scenario in which the source data is layered, to be specific, in a scenario in which the source data is sent in two layers: the basic layer and the enhancement layer, and the data communication manner includes an MCS and/or a resource scheduling manner of data communication, step 502 includes:

The network device determines an initial MCS index of data communication at the basic layer based on the first network transmission quality information and the first CSI, adjusts the MCS index of data communication at the basic layer, and/or determines a resource scheduling priority of data communication at the basic layer; and the network device determines an initial MCS index of data communication at the enhancement layer based on the second network transmission quality information and the second CSI, adjusts the MCS index of data communication at the enhancement layer, and/or determines a resource scheduling priority of data communication at the enhancement layer.

Specifically, the network device may determine an initial MCS index of data communication of the basic layer, a scheduling priority of an initially allocated resource of the basic layer, and/or an initially allocated scheduling resource of the basic layer based on the first network transmission quality information and the first CSI, and optionally, further based on at least one of a preset network transmission quality threshold and a BLER target. The network device may further determine an initial MCS index of data communication of the enhancement layer, a scheduling priority of an initially allocated resource of the enhancement layer, and/or an initially allocated scheduling resource of the enhancement layer based on the second network transmission quality information and the second CSI, and optionally, further based on at least one of the preset network transmission quality threshold and the BLER target.

Subsequently, as the layered network transmission quality information dynamically changes, the network device may separately adjust the MCS index of layered data communication based on the currently obtained first network transmission quality information and second network transmission quality information. For example, a first network transmission quality information threshold preset at the basic layer is 2.5, a second network transmission quality information threshold preset at the enhancement layer is 1, an XR experience value included in (corresponding to) the currently obtained first network transmission quality information is 1.5, an XR experience value included in (corresponding to) the currently obtained second network transmission quality information is 1.2, a current MCS index of data communication at the basic layer is 20, and an MCS index indicated in a first CSI feedback obtained by the network device is 25. In this case, the network device should perform index reduction on the MCS of data communication at the basic layer based on the current obtained first network transmission quality information, and preferentially consider the data communication at the basic layer during resource allocation. However, processing on the enhancement layer by the network device may be performed with reference to an MCS index indicated in a second CSI feedback. For example, if the MCS index of data communication at the enhancement layer is 20, and the MCS index indicated in the second CSI feedback is 25, the network device performs index raising on the MCS of data communication at the enhancement layer (for example, raises to 25). For another example, a first network transmission quality information threshold preset at the basic layer is 2.5, a second network transmission quality information threshold preset at the enhancement layer is 1, an XR experience value included in (corresponding to) the currently obtained first network transmission quality information is 3, an XR experience value included in (corresponding to) the currently obtained second network transmission quality information is 0.5, a current MCS index of data communication at the basic layer is 20, an MCS index indicated in a first CSI feedback obtained by the network device is 25, and an MCS index indicated in a second CSI feedback obtained by the network device is 25. In this case, the network device may perform index raising on the MCS of data communication at the basic layer with reference to the MCS index indicated in the first CSI feedback, and perform index reduction on the MCS of data communication at the enhancement layer based on the current obtained first network transmission quality information. In addition, during resource scheduling, the network device may allocate scheduling resources to the enhancement layer to a maximum extent on a basis of ensuring data communication at the basic layer.

The network device determines or adjusts, based on the foregoing principle, the MCS indexes and/or the resource scheduling priorities of the basic layer and the enhancement layer for performing data communication with the terminal device. Correspondingly, that the terminal device accepts management performed by the network device on the data communication manner may be reflected in the data communication with the network device with reference to the foregoing content.

According to the foregoing technical solution, in a scenario in which the source data is layered, by comprehensively considering the network transmission quality information of each layer, the network device determines the MCS and/or resource scheduling manner of layered data communication, aiming to maximize the XR experience, thereby effectively improving the XR experience, and ensuring the quantity of XR users satisfied with the XR experience.

Figure 12:
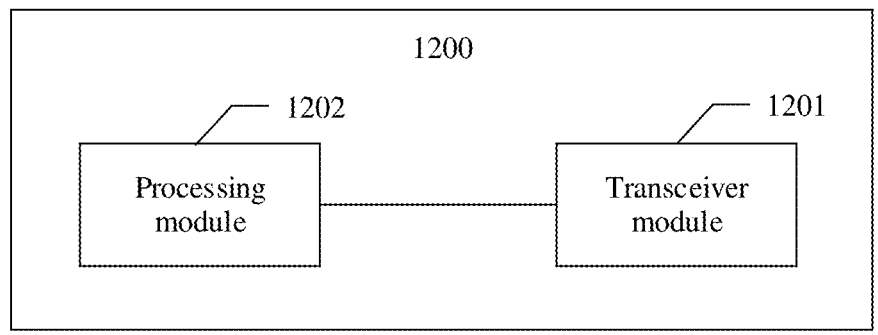
FIG. 12 is a schematic diagram of a structure of an apparatus according to at least one embodiment of this application.

Same as the foregoing concept, as shown in FIG. 12, at least one embodiment of this application further provides an apparatus 1200. In some embodiments, the apparatus 1200 is a communication apparatus. In at least one embodiment, the communication apparatus is a terminal device or a network device. The apparatus 1200 includes a transceiver module 1201 and a processing module 1202.

In an example, the apparatus 1200 is configured to implement functions of the network device in the foregoing methods. The apparatus may be a network device, or may be an apparatus in the network device. The apparatus may be a chip system. In at least one embodiment of this application, the chip system may include a chip, or may include a chip and another discrete component.

The transceiver module 1201 is configured to obtain network transmission quality information and channel state information CSI, where the network transmission quality information indicates communication quality of XR data during network transmission. The processing module 1202 is configured to manage a data communication manner based on the network transmission quality information and the CSI.

For specific execution processes of the processing module 1202 and the transceiver module 1201, refer to the descriptions in the foregoing method embodiments. Division into the modules in at least one embodiment of this application is an example of division into logical functions, or may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

In an example, the apparatus 1200 is configured to implement functions of the terminal device in the foregoing methods. The apparatus may be a terminal device, or may be an apparatus in the terminal device. The apparatus may be a chip system. In at least one embodiment of this application, the chip system may include a chip, or may include a chip and another discrete component.

The transceiver module 1201 is configured to send channel state information CSI to a network device. The processing module 1202 is configured to accept management performed by the network device on a data communication manner, where the data communication manner is determined based on the CSI and network transmission quality information, and the network transmission quality information indicates communication quality of XR data during network transmission.

For specific execution processes of the processing module 1202 and the transceiver module 1201, refer to the descriptions in the foregoing method embodiments. Division into the modules in at least one embodiment of this application is an example of division into logical functions, or may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 13:
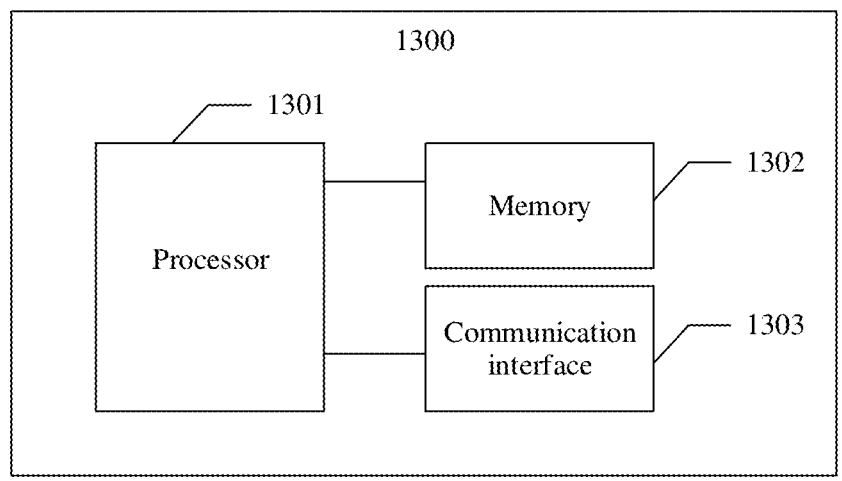
FIG. 13 is a schematic diagram of another structure of an apparatus according to at least one embodiment of this application.

Same as the foregoing concept, as shown in FIG. 13, at least one embodiment of this application further provides an apparatus 1300. In some embodiments, the apparatus 1300 is a communication apparatus. In at least one embodiment, the communication apparatus is a terminal device or a network device.

In an example, the apparatus 1300 is configured to implement functions of the terminal device in the foregoing methods. The apparatus may be a terminal device, or may be an apparatus in the terminal device. The apparatus 1300 includes at least one processor 1301, configured to implement the functions of the terminal device in the foregoing methods. For example, the processor 1301 may accept management performed by the network device on a data communication manner. The data communication manner is determined based on the CSI and network transmission quality information, and the network transmission quality information indicates communication quality of XR data during network transmission. For details, refer to detailed descriptions in the methods. Details are not described herein again. The apparatus 1300 may further include at least one memory 1302, configured to store program instructions and/or data. The memory 1302 is coupled to the processor 1301. Coupling in at least one embodiment of this application is indirect coupling or a communication connection between apparatuses, units, or modules, may be in an electrical form, a mechanical form, or another form, and is used for information exchange between apparatuses, units, or modules. In another implementation, the memory 1302 may alternatively be located outside the apparatus 1300. The processor 1301 may operate in collaboration with the memory 1302. The processor 1301 may execute program instructions stored in the memory 1302. At least one of the at least one memory may be included in the processor. The apparatus 1300 may further include a communication interface 1303, configured to communicate with another device through a transmission medium, so that an apparatus in the apparatus 1300 can communicate with the another device. For example, the communication interface 1303 may be a transceiver, a circuit, a bus, a module, or another type of communication interface, and the another device may be a network device. The processor 1301 receives and sends data through the communication interface 1303, and is configured to implement the methods in the foregoing embodiments. For example, the communication interface 1303 may send CSI to the network device.

In an example, the apparatus 1300 is configured to implement functions of the network device in the foregoing methods. The apparatus may be a network device, or may be an apparatus in the network device. The apparatus 1300 includes at least one processor 1301, configured to implement the functions of the network device in the foregoing methods. For example, the processor 1301 may obtain network transmission quality information and channel state information CSI, where the network transmission quality information indicates communication quality of XR data during network transmission; and may manage a data communication manner based on the network transmission quality information and the CSI. For details, refer to detailed descriptions in the methods. Details are not described herein again. The apparatus 1300 may further include at least one memory 1302, configured to store program instructions and/or data. The memory 1302 is coupled to the processor 1301. Coupling in at least one embodiment of this application is indirect coupling or a communication connection between apparatuses, units, or modules, may be in an electrical form, a mechanical form, or another form, and is used for information exchange between apparatuses, units, or modules. In another implementation, the memory 1302 may alternatively be located outside the apparatus 1300. The processor 1301 may operate in collaboration with the memory 1302. The processor 1301 may execute program instructions stored in the memory 1302. At least one of the at least one memory may be included in the processor. The apparatus 1300 may further include a communication interface 1303, configured to communicate with another device through a transmission medium, so that an apparatus in the apparatus 1300 can communicate with the another device. For example, the communication interface 1303 may be a transceiver, a circuit, a bus, a module, or another type of communication interface, and the another device may be a terminal device or a core network device. The processor 1301 receives and sends data through the communication interface 1303, and is configured to implement the methods in the foregoing embodiments. For example, the communication interface 1303 may receive the CSI and the network transmission quality information.

A connection medium between the communication interface 1303, the processor 1301, and the memory 1302 is not limited in at least one embodiment of this application.

In at least one embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to at least one embodiment of this application may be directly performed and completed by a hardware processor, or may be performed and completed by a combination of hardware and software modules in the processor.

In at least one embodiment of this application, the memory may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other non-transitory medium that can carry or store expected program code in a form of an instruction structure or a data structure and that can be accessed by a computer, but is not limited thereto. The memory in at least one embodiment of this application may alternatively be a circuit or any other apparatus that can implement a storage function, and is configured to store program instructions and/or data.

All or some of the methods in embodiments of this application may be implemented through software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of the instant application are generated. The computer may be a general-purpose computer, a dedicated computer, a computer network, a network device, user equipment, or another programmable apparatus. The computer instructions may be stored in a non-transitory computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

The invention claimed is:

1. A communication method, comprising:
obtaining network transmission quality information and channel state information (CSI), wherein the network transmission quality information indicates communication quality of extended reality (XR) data during network transmission; and
managing a data communication manner based on the network transmission quality information and the CSI,
wherein the data communication manner is based on multiple-input multiple-output (MIMO),
wherein the managing the data communication manner comprises:
 determining pairing that is based on multiple-user multiple-input multiple-output (MU-MIMO), and
 determining a scheduling sequence that is based on single-user multiple-input multiple-output (SU-MIMO), and
wherein the managing the data communication manner comprises:
 determining, based on the CSI, a first terminal device group that meets an MU-MIMO pairing condition, and filtering terminal devices in the first terminal device group based on the network transmission quality information, to obtain a second terminal device group participating in MU-MIMO pairing;
 obtaining, based on the network transmission quality information, a scheduling sequence that is based on SU-MIMO for terminal devices in the second terminal device group; and
 filtering transport layers of the terminal devices in the second terminal device group based on the scheduling sequence that is based on SU-MIMO and the network transmission quality information, to obtain transport layers that are of the terminal devices in the second terminal device group and that participate in MU-MIMO pairing.

2. The method according to claim 1, wherein
source data corresponding to the data communication manner is divided into source data of a basic layer and source data of an enhancement layer, and
the network transmission quality information comprises:
 first network transmission quality information corresponding to the basic layer,
 second network transmission quality information corresponding to the enhancement layer, and
 total network transmission quality information.

3. A communication apparatus, comprising:
at least one processor; and
one or more memories including computer instructions executable by the at least one processor to cause the communication apparatus to perform operations comprising:
obtaining network transmission quality information and channel state information (CSI), wherein the network transmission quality information indicates communication quality of extended reality (XR) data during network transmission; and
managing a data communication manner based on the network transmission quality information and the CSI,
wherein the data communication manner is based on multiple-input multiple-output (MIMO),
wherein the managing the data communication manner comprises:
 determining pairing that is based on multiple-user multiple-input multiple-output (MU-MIMO), and
 determining a scheduling sequence that is based on single-user multiple-input multiple-output (SU-MIMO), and
wherein the managing the data communication manner comprises:
 determining, based on the CSI, a first terminal device group that meets an MU-MIMO pairing condition, and filtering terminal devices in the first terminal device group based on the network transmission quality information, to obtain a second terminal device group participating in MU-MIMO pairing;
 obtaining, based on the network transmission quality information, a scheduling sequence that is based on SU-MIMO for terminal devices in the second terminal device group; and
 filtering transport layers of the terminal devices in the second terminal device group based on the scheduling sequence that is based on SU-MIMO and the network transmission quality information, to obtain transport layers that are of the terminal devices in the second terminal device group and that participate in MU-MIMO pairing.

4. The communication apparatus according to claim 3, wherein
source data corresponding to the data communication manner is divided into source data of a basic layer and source data of an enhancement layer, and
the network transmission quality information comprises:
 first network transmission quality information corresponding to the basic layer,
 second network transmission quality information corresponding to the enhancement layer, and
 total network transmission quality information.

5. A communication apparatus, comprising:
at least one processor; and
one or more memories including computer instructions executable by the at least one processor to cause the communication apparatus to perform operations comprising:
sending channel state information (CSI) to a network device; and
accepting management performed by the network device on a data communication manner, wherein
the data communication manner is determined based on the CSI and network transmission quality information,
the network transmission quality information indicates communication quality of extended reality (XR) data during network transmission,
the data communication manner is based on multiple-input multiple-output (MIMO),
the accepting the management performed by the network device comprises:
 accepting pairing information based on multiple-user multiple-input multiple-output (MU-MIMO), and
 accepting scheduling sequence information based on single-user multiple-input multiple-output (SU-MIMO),
the CSI is usable to determine a first terminal device group that meets an MU-MIMO pairing condition, and the network transmission quality information is usable to filter terminal devices in the first terminal device group, to obtain a second terminal device group participating in MU-MIMO pairing, the network transmission quality information is further usable to obtain a scheduling sequence that is based on SU-MIMO for terminal devices in the second terminal device group, and the scheduling sequence that is based on SU-MIMO and the network transmission quality information are usable to filter transport layers of the terminal devices in the second terminal device group, to obtain transport layers that are of the terminal devices in the second terminal device group and that participate in MU-MIMO pairing.

6. The communication apparatus according to claim 5, wherein the operations further comprise:
sending the network transmission quality information to the network device.

7. The communication apparatus according to claim 5, wherein
the data communication manner comprises at least one of:
a modulation and coding scheme (MCS), or
a resource scheduling manner of data communication.

8. The communication apparatus according to claim 7, wherein
the accepting the management performed by the network device comprises at least one of:
receiving an initial MCS index of the data communication, and an adjusted MCS index of the data communication, or
receiving priority information of resource scheduling of the data communication.

9. The communication apparatus according to claim 5, wherein
source data corresponding to the data communication manner is divided into source data of a basic layer and source data of an enhancement layer,
the network transmission quality information comprises:
first network transmission quality information corresponding to the basic layer,
second network transmission quality information corresponding to the enhancement layer, and
total network transmission quality information,
the CSI comprises first CSI corresponding to the basic layer, and second CSI corresponding to the enhancement layer, and
the data communication manner is determined based on the first CSI, the second CSI, and at least one of:
the total network transmission quality information,
the first network transmission quality information, or
the second network transmission quality information.

10. The communication apparatus according to claim 5, wherein
the network transmission quality information comprises at least one of an XR quality index (XQI), an XQI threshold, or an XQI gain.

11. The method according to claim 1, wherein
the data communication manner comprises at least one of:
a modulation and coding scheme (MCS), or
a resource scheduling manner of data communication.

12. The method according to claim 11, wherein
the managing the data communication manner comprises at least one of:
determining an initial MCS index of the data communication based on the network transmission quality information and the CSI,
adjusting an MCS index of the data communication, or
determining priority information of resource scheduling of the data communication.

13. The method according to claim 2, wherein
the managing the data communication manner comprises:
filtering the terminal devices in the first terminal device group, based on at least one of:
the total network transmission quality information, the first network transmission quality information, or the second network transmission quality information, to obtain the second terminal device group;
obtaining the scheduling sequence that is based on SU-MIMO for the terminal devices in the second terminal device group, based on at least one of: the total network transmission quality information, the first network transmission quality information, or the second network transmission quality information; and
filtering at least one of first transport layers or second transport layers of the terminal devices in the second terminal device group, based on the scheduling sequence that is based on SU-MIMO and at least one of: the total network transmission quality information, the first network transmission quality information, or the second network transmission quality information, to obtain at least one of third transport layers or fourth transport layers that are of the terminal devices in the second terminal device group and that participate in MU-MIMO pairing, wherein
the first transport layers and the third transport layers correspond to the basic layer, and
the second transport layers and the fourth transport layers correspond to the enhancement layer.

14. The method according to claim 2, wherein
the CSI comprises first CSI corresponding to the basic layer, and second CSI corresponding to the enhancement layer, and
the managing the data communication manner comprises:
at least one of:
determining an initial modulation and coding scheme (MCS) index of the data communication at the basic layer, based on the first network transmission quality information and the first CSI,
adjusting an MCS index of the data communication at the basic layer, or
determining priority information of resource scheduling of the data communication at the basic layer; and
at least one of:
determining an initial MCS index of the data communication at the enhancement layer based on the second network transmission quality information and the second CSI,
adjusting an MCS index of the data communication at the enhancement layer, or
determining priority information of resource scheduling of the data communication at the enhancement layer.

15. The method according to claim 1, wherein
the network transmission quality information comprises at least one of an XR quality index (XQI), an XQI threshold, or an XQI gain.

16. The communication apparatus according to claim 3, wherein
the data communication manner comprises at least one of:
a modulation and coding scheme (MCS), or
a resource scheduling manner of data communication.

17. The communication apparatus according to claim 16, wherein
the managing the data communication manner comprises at least one of:
determining an initial MCS index of the data communication based on the network transmission quality information and the CSI,
adjusting an MCS index of the data communication, or
determining priority information of resource scheduling of the data communication.

18. The communication apparatus according to claim 4, wherein
the managing the data communication manner comprises:
filtering the terminal devices in the first terminal device group, based on at least one of:
the total network transmission quality information, the first network transmission quality information, or the second network transmission quality information, to obtain the second terminal device group;
obtaining the scheduling sequence that is based on SU-MIMO for the terminal devices in the second terminal device group, based on at least one of: the total network transmission quality information, the first network transmission quality information, or the second network transmission quality information; and
filtering at least one of first transport layers or second transport layers of the terminal devices in the second terminal device group, based on the scheduling sequence that is based on SU-MIMO and at least one of: the total network transmission quality information, the first network transmission quality information, or the second network transmission quality information, to obtain at least one of third transport layers or fourth transport layers that are of the terminal devices in the second terminal device group and that participate in MU-MIMO pairing, wherein
the first transport layers and the third transport layers correspond to the basic layer, and
the second transport layers and the fourth transport layers correspond to the enhancement layer.

19. The communication apparatus according to claim 4, wherein
the CSI comprises first CSI corresponding to the basic layer, and second CSI corresponding to the enhancement layer, and
the managing the data communication manner comprises:
at least one of:
determining an initial modulation and coding scheme (MCS) index of the data communication at the basic layer, based on the first network transmission quality information and the first CSI,
adjusting an MCS index of the data communication at the basic layer, or
determining priority information of resource scheduling of the data communication at the basic layer; and
at least one of:
determining an initial MCS index of the data communication at the enhancement layer based on the second network transmission quality information and the second CSI,
adjusting an MCS index of the data communication at the enhancement layer, or
determining priority information of resource scheduling of the data communication at the enhancement layer.

20. The communication apparatus according to claim 3, wherein
the network transmission quality information comprises at least one of an XR quality index (XQI), an XQI threshold, or an XQI gain.

* * * * *